Aug. 18, 1942.   H. T. PLATZ   2,293,169
WELDING FIXTURE
Filed March 31, 1941   14 Sheets-Sheet 1
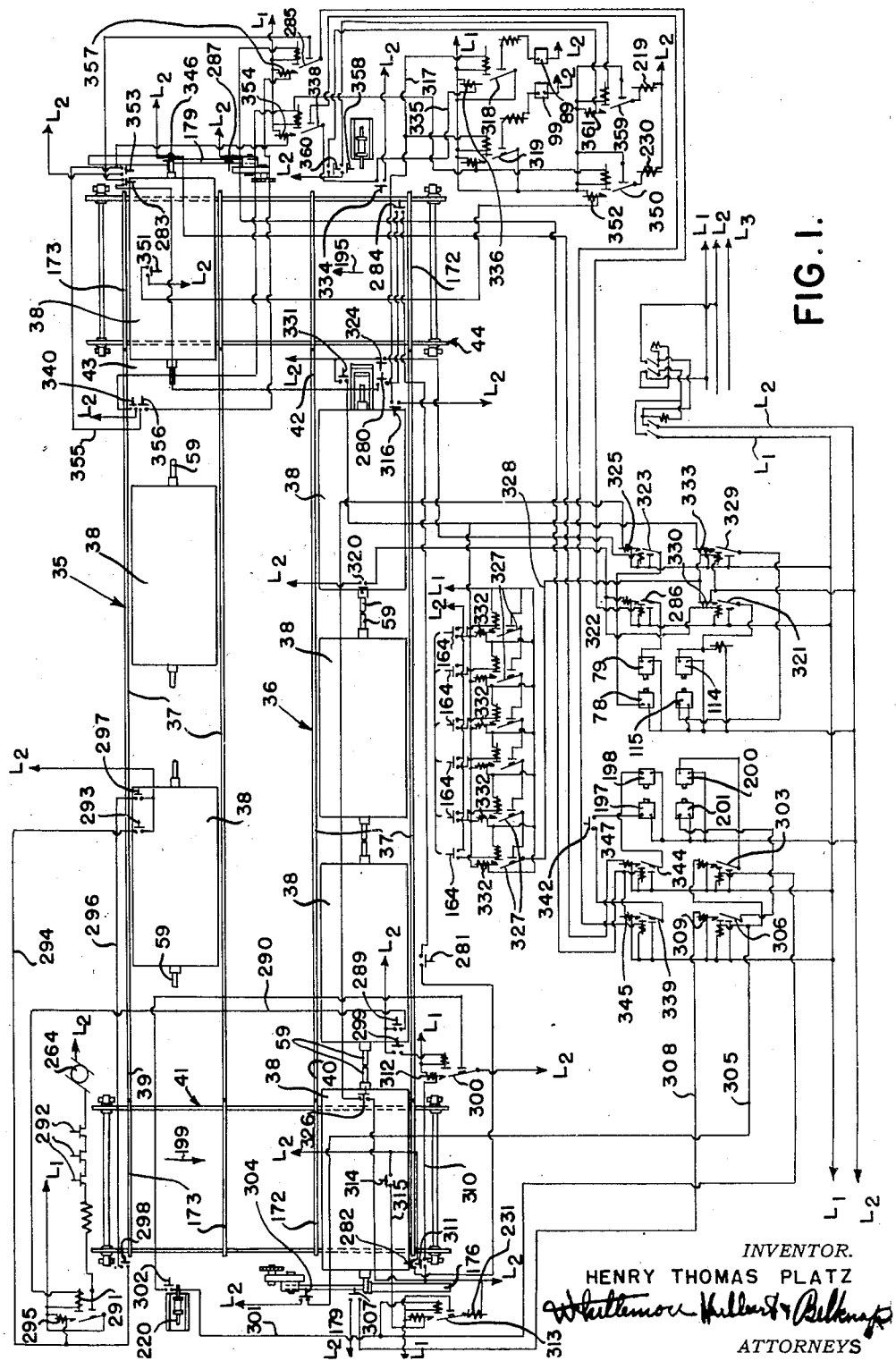
FIG. I.
INVENTOR.
HENRY THOMAS PLATZ
ATTORNEYS Aug. 18, 1942.  H. T. PLATZ  2,293,169
WELDING FIXTURE
Filed March 31, 1941  14 Sheets-Sheet 2
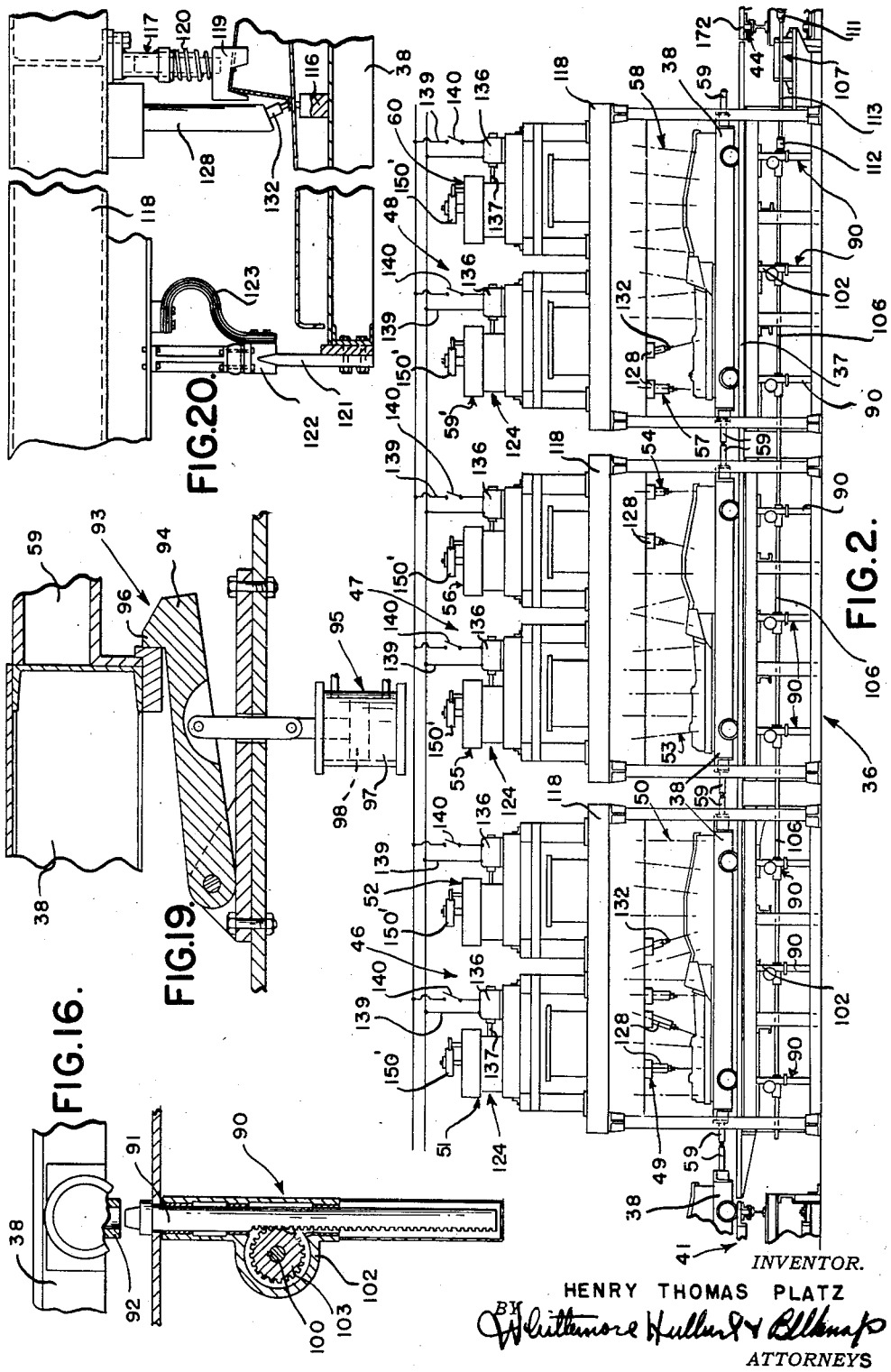
INVENTOR.
HENRY THOMAS PLATZ
BY Whittemore Hulbert & Belknap
ATTORNEYS

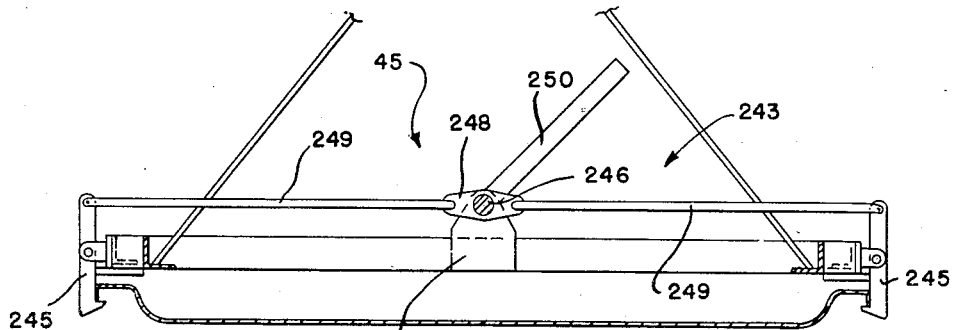
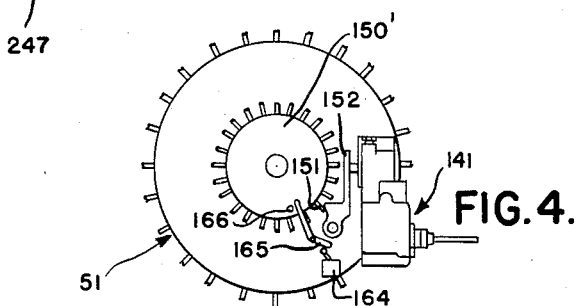
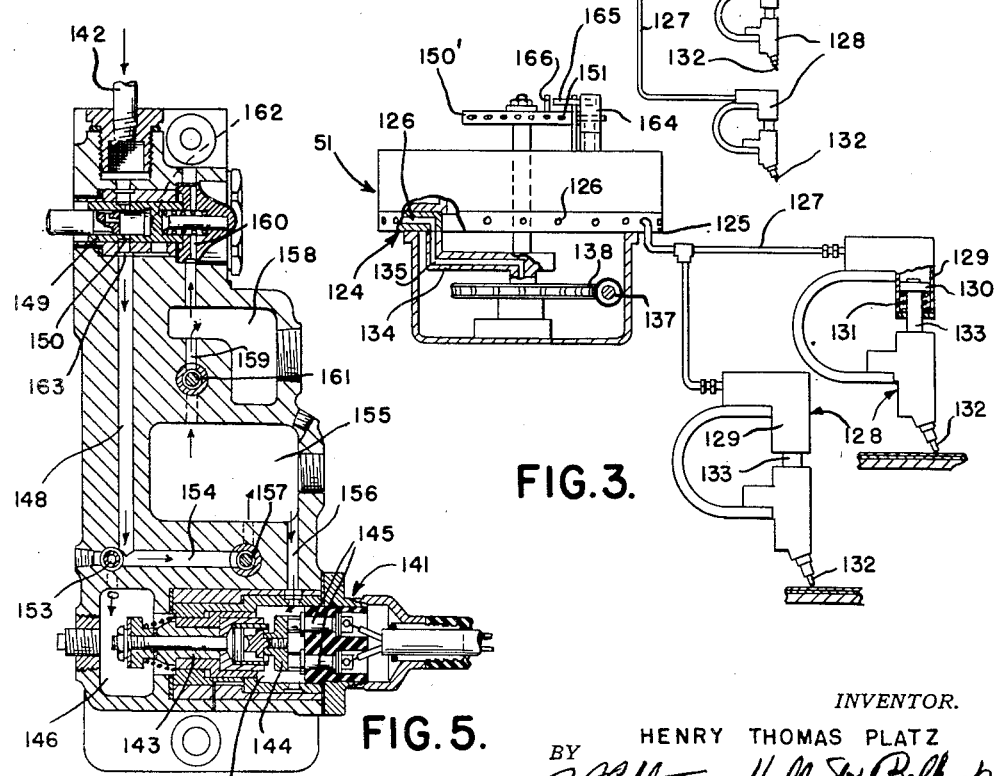

Aug. 18, 1942.  H. T. PLATZ  2,293,169
WELDING FIXTURE
Filed March 31, 1941  14 Sheets-Sheet 4

INVENTOR.
HENRY THOMAS PLATZ
BY Whittemore Hulbert & Belknap
ATTORNEYS

Aug. 18, 1942.                H. T. PLATZ                2,293,169
                            WELDING FIXTURE
                       Filed March 31, 1941        14 Sheets-Sheet 5
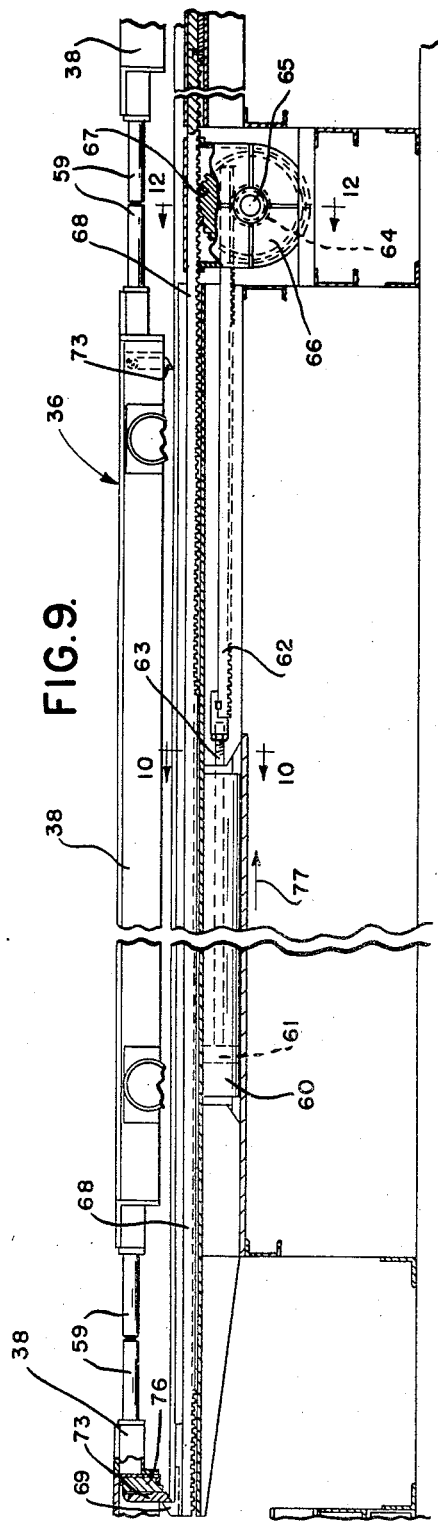
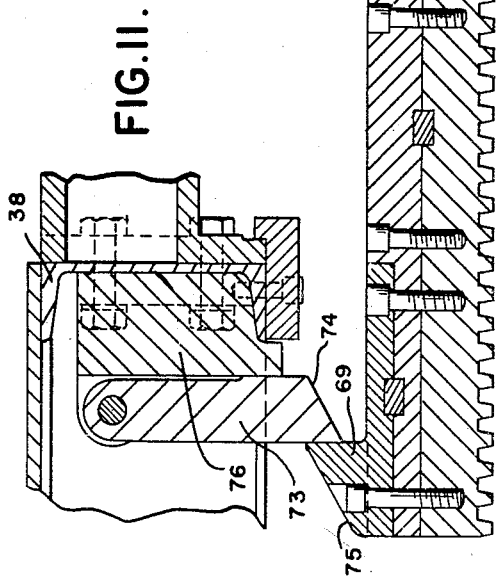
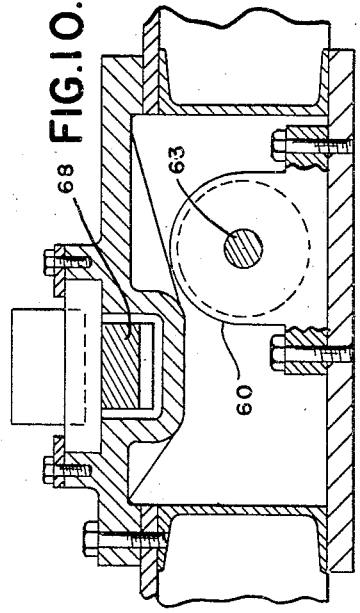
INVENTOR.
HENRY THOMAS PLATZ
BY Whittemore Hulbert & Belknap
ATTORNEYS Aug. 18, 1942.    H. T. PLATZ    2,293,169
WELDING FIXTURE
Filed March 31, 1941    14 Sheets-Sheet 6

INVENTOR.
HENRY THOMAS PLATZ
BY
*Whittemore Hulbert & Belknap*
ATTORNEYS

Aug. 18, 1942.  H. T. PLATZ  2,293,169
WELDING FIXTURE
Filed March 31, 1941  14 Sheets-Sheet 7
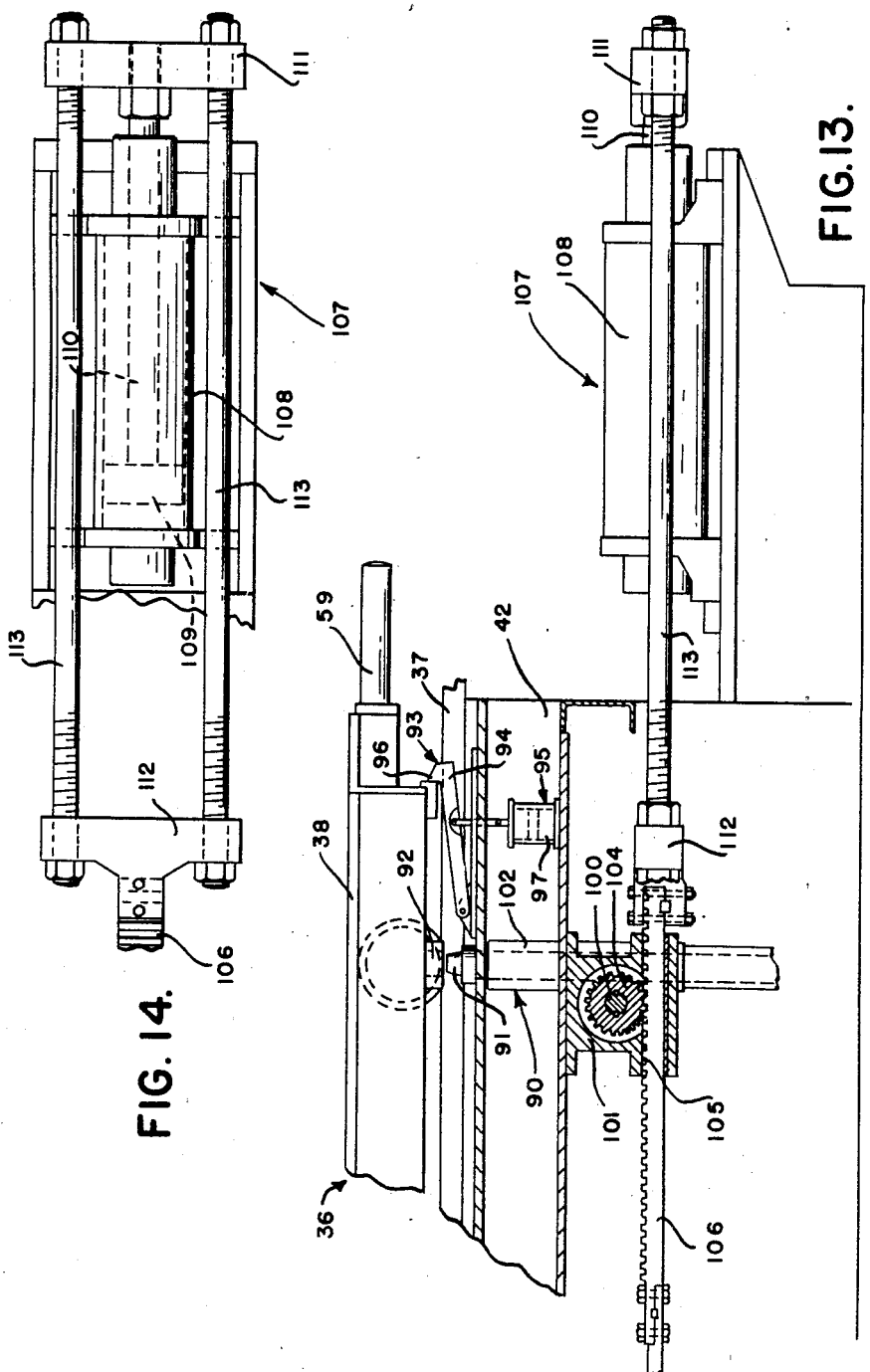
INVENTOR.
HENRY THOMAS PLATZ
BY Whittemore Hulbert & Belknap
ATTORNEY.

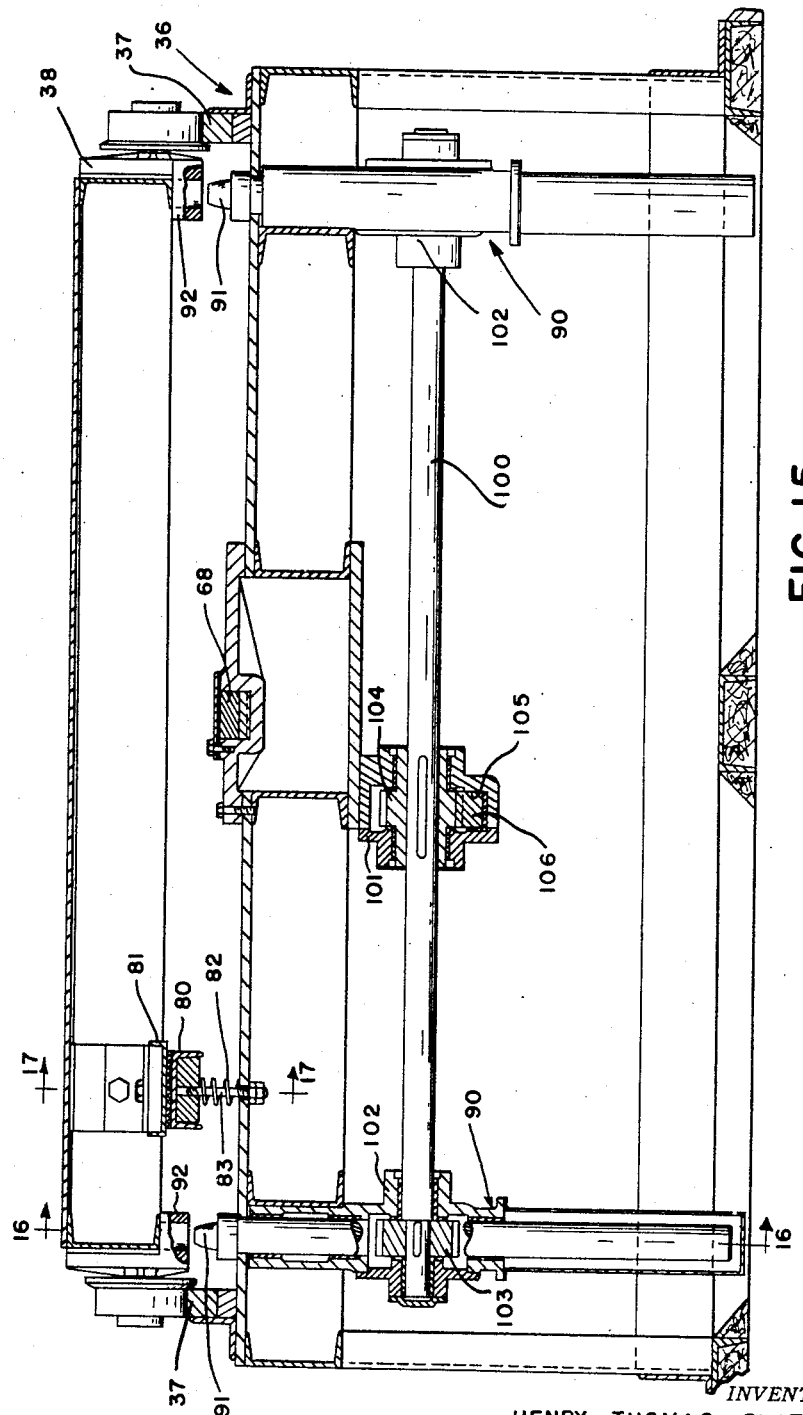

Aug. 18, 1942.                H. T. PLATZ                    2,293,169
                             WELDING FIXTURE
                        Filed March 31, 1941          14 Sheets-Sheet 9
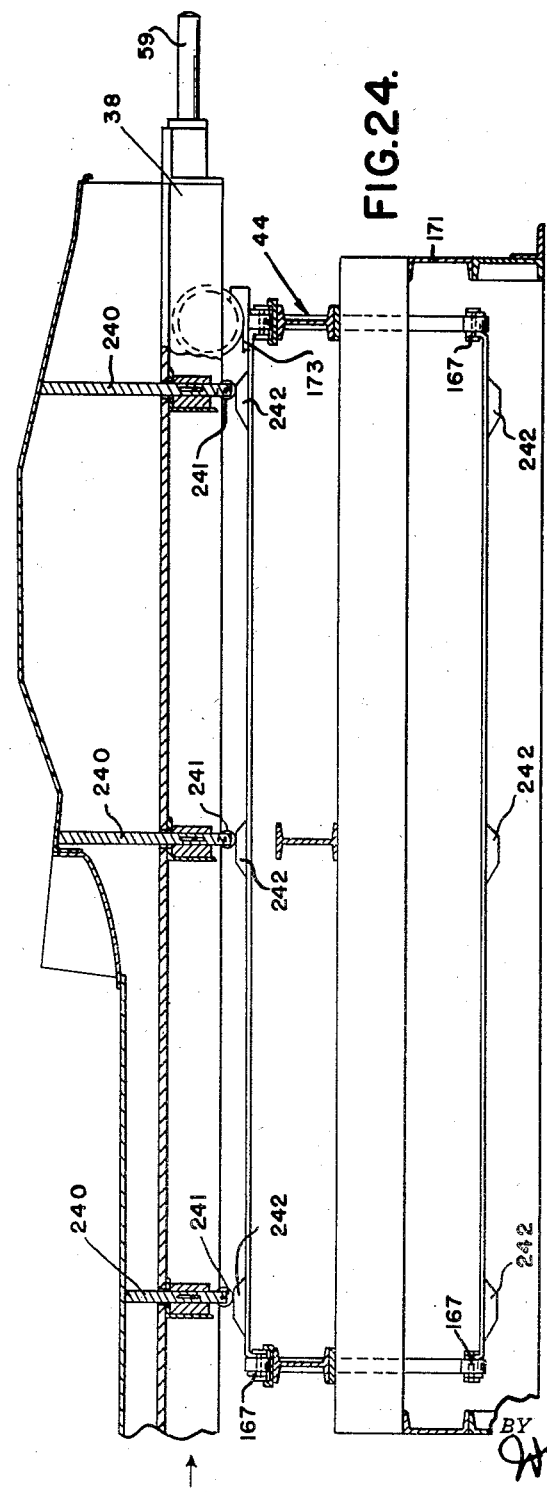
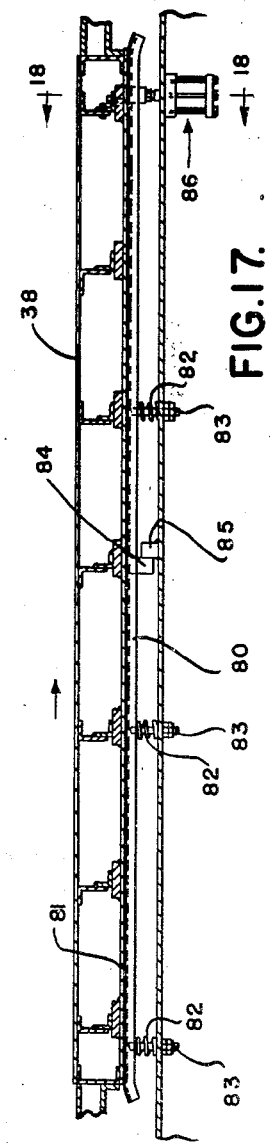
INVENTOR.
HENRY THOMAS PLATZ
BY
ATTORNEYS

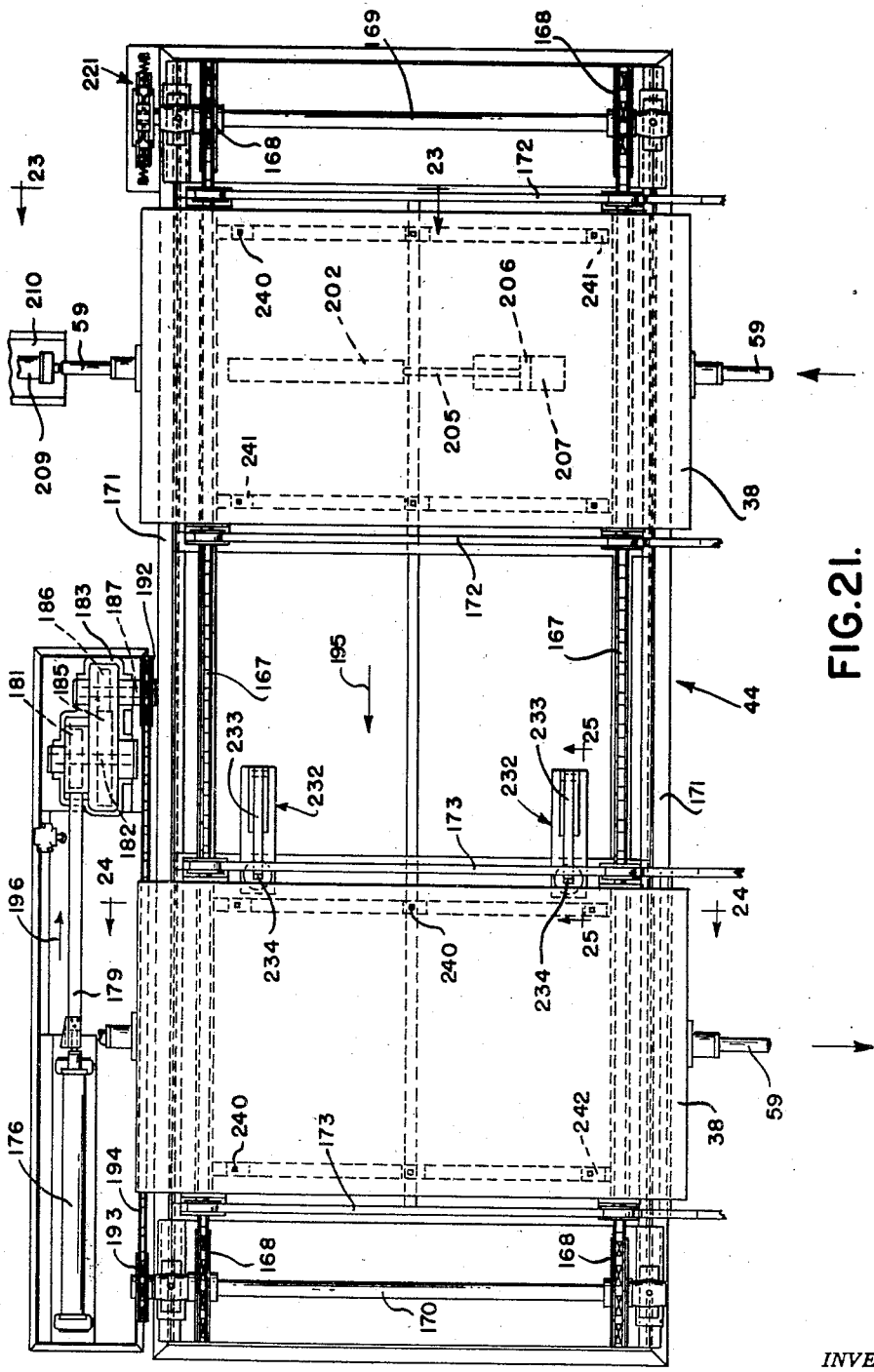

Aug. 18, 1942.  H. T. PLATZ  2,293,169
WELDING FIXTURE
Filed March 31, 1941  14 Sheets-Sheet 11

INVENTOR.
HENRY THOMAS PLATZ
BY
Whittemore Hulbert & Belknap
ATTORNEYS

Aug. 18, 1942.  H. T. PLATZ  2,293,169
WELDING FIXTURE
Filed March 31, 1941  14 Sheets-Sheet 12
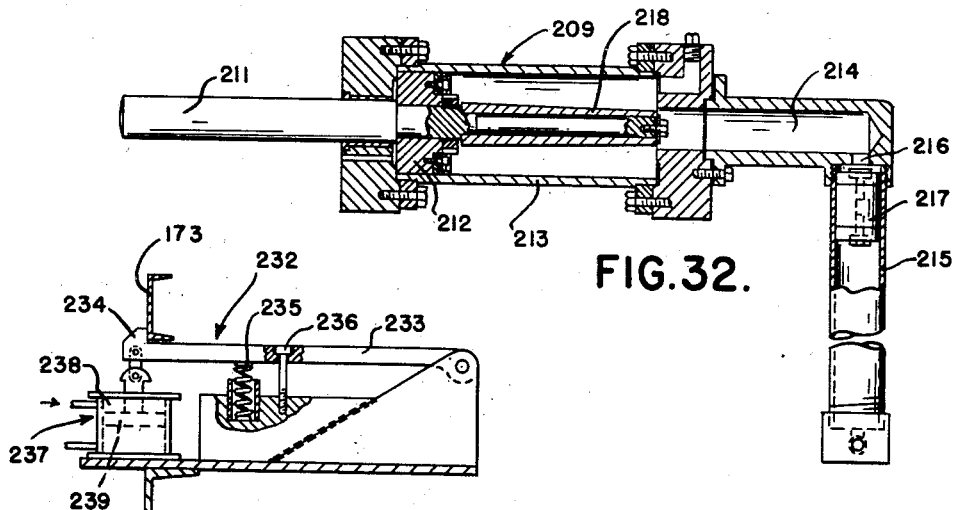
FIG. 32.
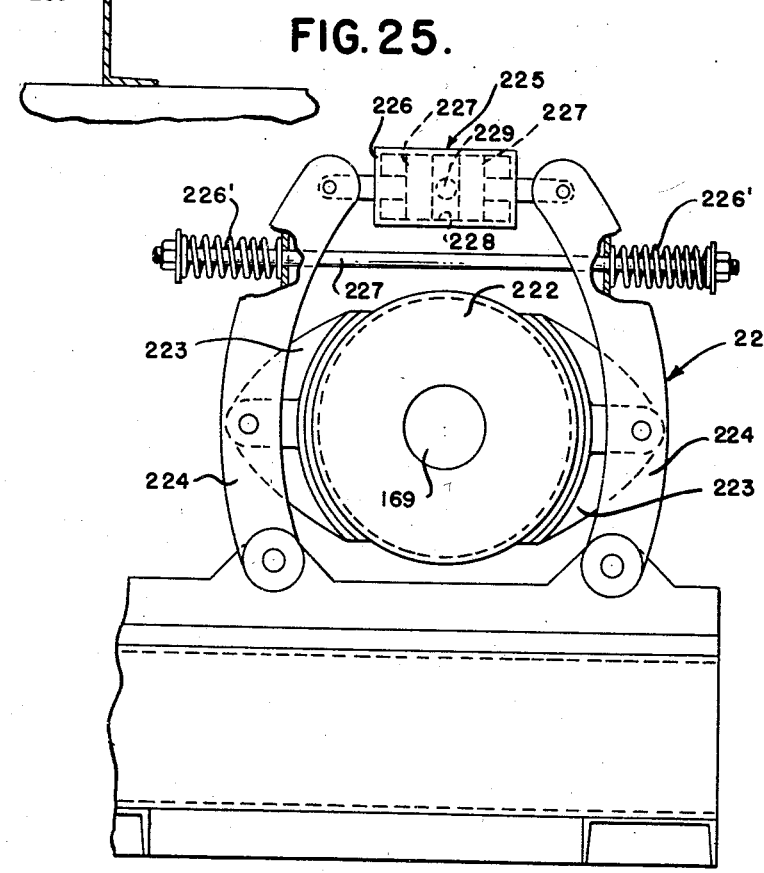
FIG. 25.
FIG. 29.
INVENTOR.
HENRY THOMAS PLATZ
BY
ATTORNEYS

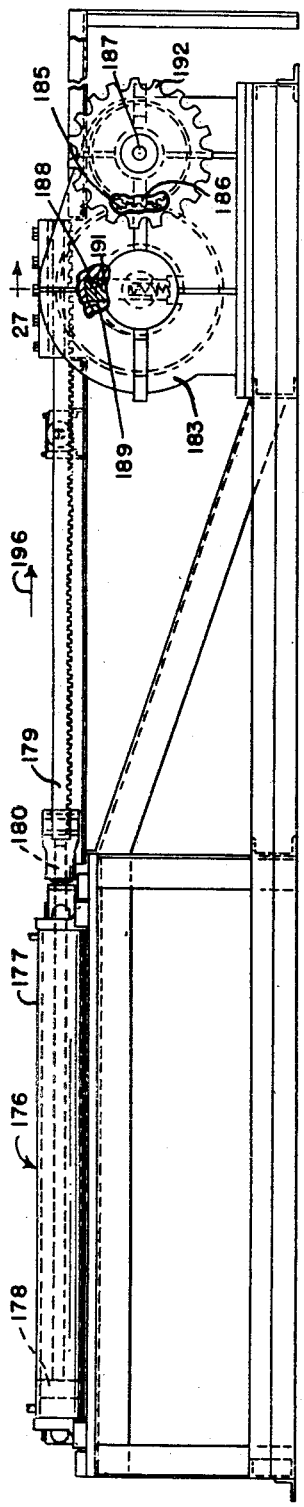
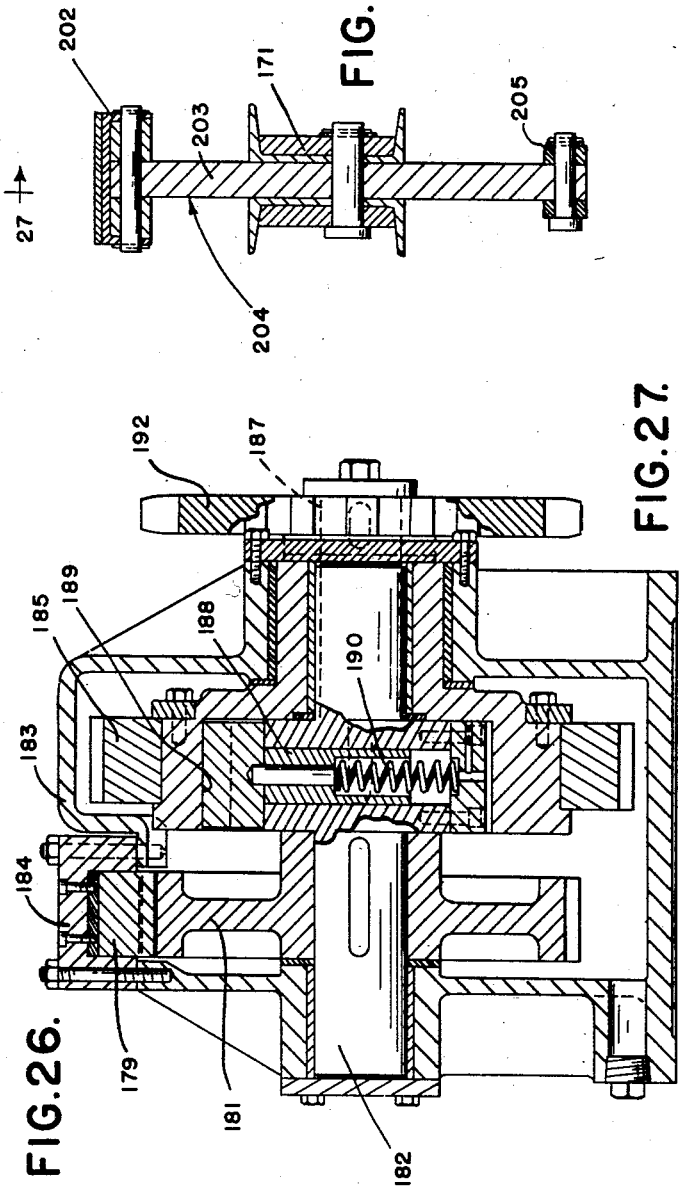

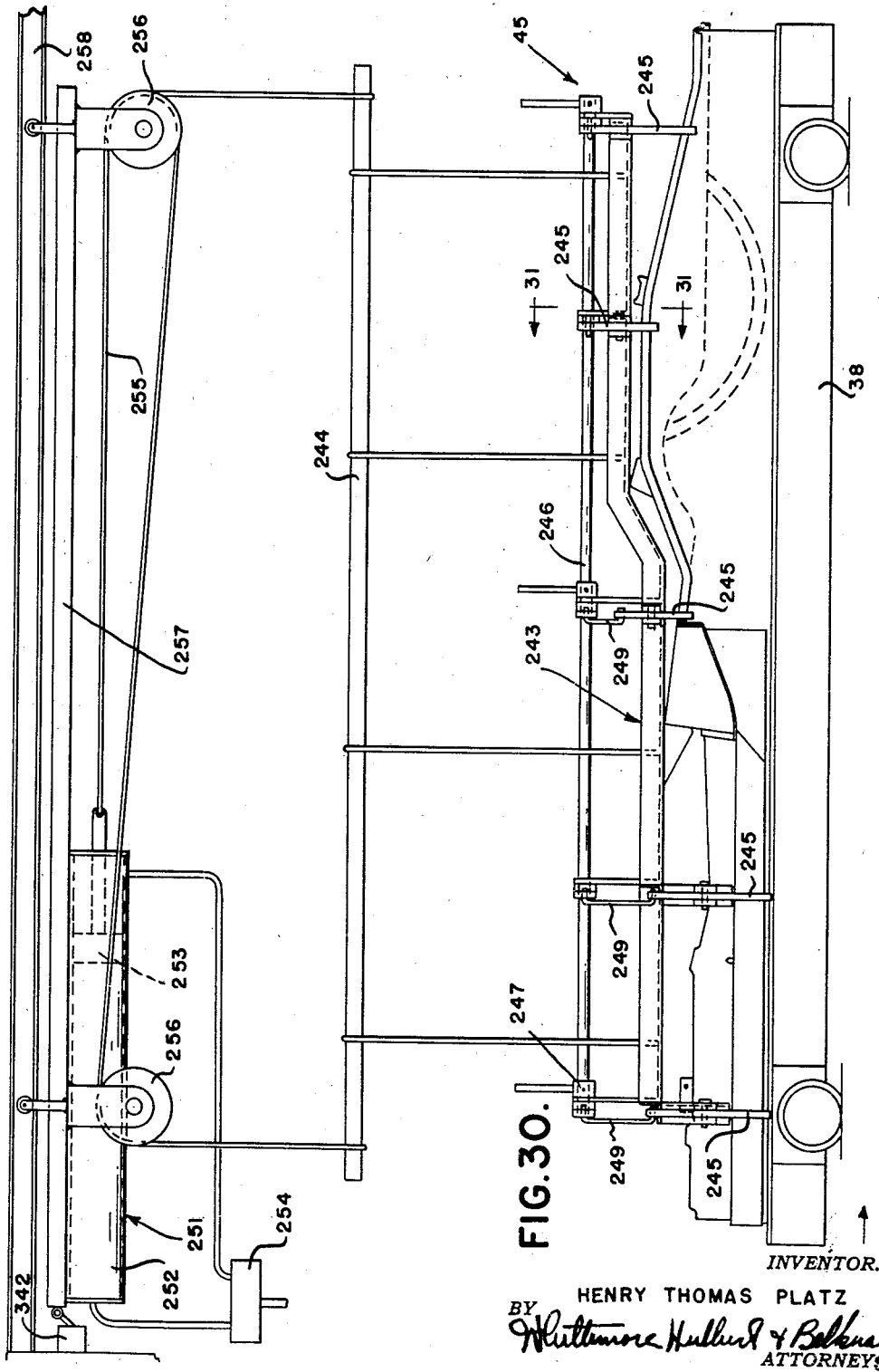

Patented Aug. 18, 1942

2,293,169

UNITED STATES PATENT OFFICE 2,293,169

WELDING FIXTURE

Henry Thomas Platz, Detroit, Mich., assignor to Briggs Manufacturing Company, Detroit, Mich., a corporation of Michigan Application March 31, 1941, Serial No. 386,160

23 Claims. (Cl. 219—4)

This invention relates generally to welding apparatus and refers more particularly to improvements in fixtures for use in conjunction with welding equipment.

It is one of the principal objects of this invention to provide a welding fixture which is thoroughly automatic in operation and which is capable of welding the work at a plurality of points in the minimum length of time.

Another object of this invention is to provide a fixture having a plurality of groups of welders supported above a conveyer track in spaced relation to each other in the direction of length of the track and having work supporting carriages movable along the track by a step by step movement to successively register the work on the carriages with the groups of welders.

Another object of this invention is to provide means operable during the intervals of rest of the carriages to simultaneously lift the carriages off the track to position the work on the carriages in operative relation to the welders.

Another feature of this invention is to provide means responsive to movement of the work into operative relationship with the welders to effect an operation of the welders and thereby weld the work at a plurality of points.

Still another feature of the present invention is to provide a fixture of the above type wherein each group of welders is operated independently of one another and wherein the operating means for each group of welders is initiated by the carriages as the latter are raised to their uppermost positions with respect to the welders. By providing independent operating means for the several groups of welders, one group may possess a different welding cycle than another group, and this is advantageous in cases where the thickness of the metal of certain parts of the work to be welded is different from the thickness of the metal or other parts of the work to be welded.

Another object of this invention which contributes materially to obtaining the above advantage consists in providing a fixture wherein each group of welders comprises a plurality of sets of welders which are operated independently of one another to weld the work on the carriages as the latter are moved to their uppermost positions with respect to the welders.

Still another feature of the present invention is to provide a fixture having means for returning the carriages to positions on the track and having means for rendering the operation of the last named means inoperative until each group or set of welders has completed its welding cycle.

A still further feature of this invention is to provide a fixture having means for moving a carriage with the work to be welded thereon into registration with the entrant end of the conveyer track during the intervals of rest of the carriages on the track and having additional means for transferring a carriage from the delivery end of the conveyer track to a loading station.

Still another object of the present invention is to provide indexing mechanism for the carriages on the conveyer track including an electric circuit having switches connected in series therein and adapted to be respectively closed by the carriages as the latter assume positions at the entrant end of the conveyer track and at the loading station.

Still another object of this invention is to position the carriages on the conveyer track with the adjacent ends of the carriages abutting one another so that motion transmitted to the carriage at the entrant end of the track effects a corresponding movement of the remaining carriages on the track.

A still further object of this invention consists in connecting a switch in series in the indexing circuit and providing means for closing the switch in response to return movement of the carriages to positions on the track. With this arrangement, the indexing mechanism is prevented from operating until the carriages have assumed positions on the track.

Another object of this invention is to provide a cross conveyer between the delivery end of the welding conveyer track and the loading station for transferring the carriages leaving the delivery end of the welding conveyer track to the loading station and to further provide means for moving the transfer carriage rendered operative by a carriage as the latter is moved from the delivery end of the conveyer track to a position on the cross conveyer.

Another advantageous feature of the present invention is to provide a loading conveyer extending from the loading station to a position adjacent the entrant end of the welding conveyer track and to connect the delivery end of the loading conveyer to the entrant end of the welding conveyer by a cross conveyer.

A still further object of the present invention is to provide means rendered operative by movement of a carriage on the cross conveyer from the delivery end of the loading conveyer to move the cross conveyer in a direction to position the carriage in registration with the entrant end of the welding conveyer.

Another object of this invention is to provide means operated by a carriage on the welding conveyer upon initial indexing movement of the carriage to effect operation of the loading conveyer so that the latter moves during the interval the carriages on the welding conveyer are advanced by the indexing mechanism.

A further object of this invention is to provide means for operating the cross conveyer at the delivery end of the loading conveyer including an electric circuit having a pair of switches connected in series therein and respectively closed by a carriage movable onto the cross conveyer from the delivery end of the loading conveyer and by a carriage movable off of the cross conveyer onto the entrant end of the welding conveyer. The arrangement is such that the cross conveyer is prevented from operation until the carriage in registration with the entrant end of the welding conveyer is moved onto the latter.

A still further object of the present invention is to provide means for retarding movement of the carriages on the welding conveyer track at the ends of each indexing stroke and to provide means for positively arresting the carriages in registration with the lifting means.

The foregoing as well as other objects will be made more apparent as this description proceeds, especially when considered in connection with the accompanying drawings, wherein:

Figure 1 is a wiring diagram of the fixture forming the subject matter of this invention and diagrammatically illustrates a part of the fixture in plan view;

Figure 2 is a fragmentary side elevational view of a part of the fixture forming the subject matter of this invention;

Figure 3 is a semi-diagrammatic view partly in section illustrating a part of the welding system embodied in the fixture;

Figure 4 is a plan view of the construction shown in Figure 3;

Figure 5 is a sectional view through the welder control unit shown in Figure 4;

Figure 9 is a fragmentary side elevational view of the welding conveyer embodied in the fixture;

Figure 10 is a cross sectional view taken substantially on the line 10—10 of Figure 9;

Figure 11 is an enlarged sectional view of a part of the welding conveyer shown in Figure 9;

Figure 13 is a fragmentary side elevational view partly in section of a part of the welding conveyer;

Figure 14 is a fragmentary plan view of the construction shown in Figure 13;

Figure 15 is a transverse sectional view through the welding conveyer;

Figure 16 is a sectional view taken on the line 16—16 of Figure 15;

Figure 17 is a sectional view taken on the line 17—17 of Figure 15;

Figure 19 is a fragmentary sectional view illustrating the latch associated with the welding conveyer;

Figure 20 is a fragmentary sectional view also illustrating a part of the welding conveyer;

Figure 21 is a plan view of the cross conveyer at the delivery end of the welding conveyer;

Figure 23:
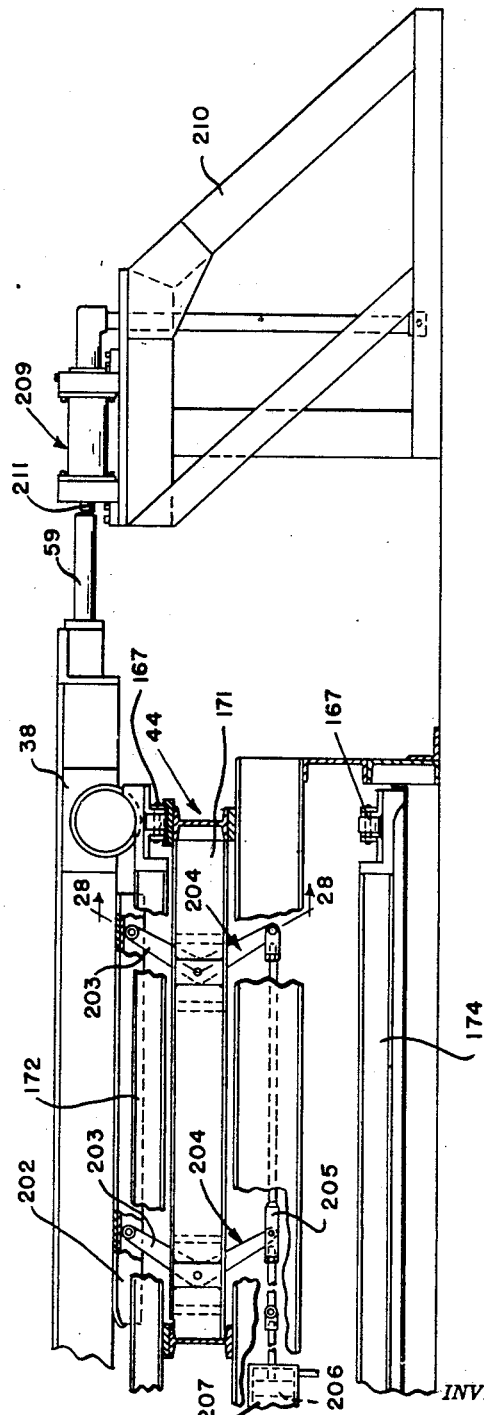

Figures 23, 24 and 25 are respectively sectional views taken on the lines 23—23, 24—24, and 25—25 of Figure 21;

Figure 26 is a side elevational view partly in section of the operating means for the cross conveyer shown in Figure 21;

Figure 27 is a sectional view taken on the line 27—27 of Figure 26;

Figure 28 is a sectional view taken on the line 28—28 of Figure 23;

Figure 29 is an end elevational view showing one of the brakes of the cross conveyer;

Figure 30 is a side elevational view showing the unloading means at the delivery end of the welding conveyer;

Figure 31 is a sectional view taken on the line 31—31 of Figure 30; and

Figure 32 is a sectional view through the bumper provided at the delivery end of the welding conveyer.

Although many of the principles of this invention may be advantageously used in instances where it is desired to produce a maximum number of welds in the minimum time interval, nevertheless, in order to illustrate the invention, I have selected a fixture especially designed for use in mass production of vehicle bodies. More particularly, the fixture illustrated herein is adapted to weld the several parts of a vehicle floor assembly together to form a unitary construction and accomplishes this result in a relatively short time interval.

In general, the fixture embodies a plurality of welders arranged in groups at a plurality of stations and adapted to operate simultaneously on floor assemblies corresponding in number to the number of welding stations. As will be presently set forth, the welders at each station are predeterminedly arranged to weld different portions of the floor assemblies together, and the latter are successively moved into operative relation to the welders at each station so that when the floor assemblies leave the last welding station, all of the various parts of the floor assemblies are permanently secured together.

With the above in mind, reference will now be made to the drawings wherein it will be noted that the fixture selected herein for the purpose of illustrating the invention comprises a loading conveyer 35 and a welding conveyer 36. The two conveyers extend parallel to one another and are positioned in lateral spaced relationship.

Upon reference to Figures 1, 2, 6, and 7, it will be noted that each conveyer comprises a pair of laterally spaced longitudinally extending tracks 37 secured to suitable frame structure and adapted to support a plurality of work supporting carriages 38. The carriages 38 have a rolling engagement with the tracks and are moved by a step by step movement along their respective tracks in a manner to be more fully hereinafter set forth.

The tracks 37 of each conveyer are of equal length and the delivery end 39 of the loading conveyer track 37 is connected to the entrant end 40 of the welding conveyer by a transfer conveyer 41. It will also be noted from Figure 1 that the delivery end 42 of the welding conveyer is connected to the entrant end 43 of the loading conveyer by means of a transfer conveyer 44. In this connection, it will be noted that the transfer conveyer 44 is shown in Figures 21 to 27, inclusive, and the transfer conveyer 41 is of the same general construction as the transfer conveyer 44 so that it is not believed necessary to illustrate the transfer conveyer in detail.

In general, it may be pointed out that the transfer conveyer 41 is adapted to receive a carriage 38 discharged from the delivery end 39 of the loading conveyer 35 and to move this carriage into registration with the entrant end 40 of the welding conveyer 36. At the same time, the transfer conveyer 44 moves the carriage 38 received from the delivery end 42 of the welding conveyer into registration with the entrant end 43 of the loading conveyer. In the present instance, the work supported by the carriage discharged from the delivery end 42 of the welding conveyer is removed from the carriage while the latter is supported on the transfer conveyer 44 by the unloading device, designated generally in Figure 30 by the reference character 45. As a result, reloading of the carriages 38 may be instituted when the carriages assume positions in registration with the entrant end 43 of the loading conveyer.

*Welding conveyer*

Upon reference to Figure 2, it will be noted that three stations 46, 47 and 48 are supported in spaced relation to each other along the welding conveyer track 37. In the present instance, two groups of welders 49 and 50 are supported above the track 37 of the welding conveyer. The welders are elevated sufficiently to permit free passage of the carriages 38 beneath the same, and the welders in each group are predeterminedly distributed to weld different parts of the work together. The operation of the welders in the group 49 is controlled by a control unit 51, and the operation of the welders in the group 50 is controlled by the control unit 52. The purpose of providing two control units at the station 46 is to permit varying the welding period of one group of welders so that the parts of the work having different thicknesses may be satisfactorily welded.

The second station 47 is also provided with two groups of welders 53 and 54 also supported directly above the track to permit the carriages 38 to pass beneath the same. The two groups of welders 54 are arranged to weld the work at points spaced from the welds obtained at station 46. It will also be noted that independent control units 55 and 56 are provided for respectively controlling the operation of the two groups of welders 53 and 54. As a result, one group of welders may have a different welding time than the other group, and this is desirous in cases where the work to be welded varies in thickness.

The third station 48 also comprises two groups of welders 57 and 58 elevated above the track 37 to permit free passage of the carriages 38 beneath the same. The welders in the two groups 57 and 58 are predeterminedly arranged to weld the work at points spaced from the welds obtained at both stations 46 and 47. The operation of the group of welders 57 is controlled by a control unit 59', and the operation of the group of welders 58 is independently controlled by a control unit 60. As pointed out above, this is desirous in that it permits varying the welding time of the welders in one group with respect to the welders in the other group so that work of different thicknesses may be satisfactorily welded.

The carriages 38 on the welding conveyer track 37 are advanced by a step by step movement to successively position the work on the carriages in registration with the welders at each of the three stations 46, 47 and 48. Upon reference to Figure 2, it will be noted that one carriage 38 is positioned at each welding station and that each carriage is provided with a bumper 59 projecting from opposite ends thereof. When the carriages 38 assume positions on the welding conveyer, the bumpers on the adjacent ends of the carriages, abut each other, and the bumper 59 on the carriage 38 supported by the transfer conveyer 41, in registration with the entrant end 40 of the welding conveyer, engages the bumper on the adjacent end of the carriage 38 supported at the first station 46. It follows from the above that movement of the carriage 38 on the transfer conveyer 41 in a direction toward the delivery end 42 of the welding conveyer effects a corresponding movement of the carriages supported on the welding conveyer at stations 46, 47 and 48.

Figure 12:
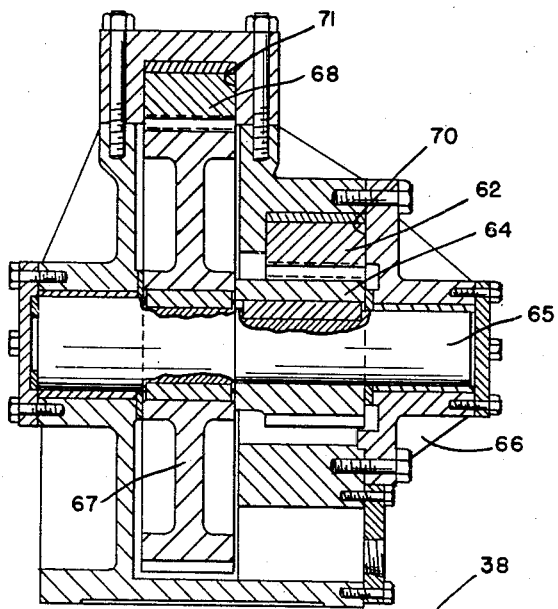
Figure 12 is a sectional view taken on the line 12—12 of Figure 9.

In the present instance, the carriages on the welding conveyer 36 are indexed a distance corresponding substantially to the length of one carriage by moving the carriage 38 off the transfer conveyer 41 onto the welding conveyer track 37 to position the work on this carriage at station 46. The preceding carriages are, of course, advanced on the welding conveyer a corresponding distance, and the carriage previously supported at the final station 48 is moved onto the transfer conveyer 44. In Figures 9 to 12, inclusive, I have illustrated one type of indexing mechanism that may be employed for the above purpose. This indexing mechanism embodies a fluid pressure operated device comprising a cylinder 60 and a piston 61 reciprocably mounted in the cylinder. The cylinder 60 is supported beneath the track 37 of the welding conveyer with its axis extending parallel to the track 37, and the piston 61 is connected to the rear end of a rack 62 by means of a connecting rod 63. The front end of the rack 62 meshes with a relatively small pinion 64 keyed to a drive shaft 65 having the opposite ends journaled in a casing 66. As shown in Figure 12, a gear 67 having a diameter substantially greater than the diameter of the pinion 64 is also keyed to the drive shaft 65 and meshes with a rack 68. The rack 68 is slidably supported on the welding conveyer in the manner shown in Figure 10 for movement longitudinally of the track 37 on the welding conveyer, and the rear end of the rack 68 has a hook 69 secured thereto. It may also be pointed out at this time that the end walls of the casing 66 are slotted to permit extending the racks therethrough, and provision is made in the casing for guiding the racks. Referring again to Figure 12, it will be noted that the rack 62 is guided by the downwardly opening channel portion 70 of the casing, and the rack 68 is guided by the downwardly opening channel portion 71.

Upon reference to Figure 9, it will be noted that the length of the rack 68 is sufficient to extend beneath the front end of a carriage 38 supported on the transfer conveyer at the entrant end 40 of the welding conveyer. The hook 69 on the rear end of the rack 68 is adapted to engage latch members 73 having the upper ends respectively pivotally mounted on the forward ends of the carriages 38. As shown in Figure 11, the lower end of each latch member 73 is fashioned to form a cam surface 74 engageable with a correspondingly shaped cam surface 75 on the hook 69 to provide for swinging movement of the latch members rearwardly by the hook 69 as the rack 68 is moved to its rearwardmost position. As shown in Figure 11, when the hook 69 is moved by the rack 68 rearwardly beyond the lower end of the latch member 73, the latter returns by gravity to a position at the front side of the hook and engages a block 76 secured to the forward end of each carriage in advance of the latch members. The blocks 76 form abutments for the latch members 73 to prevent forward swinging movement of the members 73 relative to the carriages as the hook 69 is moved forwardly by the rack 68. As a result, forward movement of the rack 68 from the position thereof shown in Figure 9 imparts a corresponding advancing movement to the carriage 38 on the transfer conveyer 41. Due to the abutting relationship of the carriage bumpers 59 previously discussed, it follows that forward movement of the carriage 38 on the transfer conveyer 41 effects a corresponding advancing movement of all of the carriages 38 on the welding conveyer.

It follows from the above that the indexing rack 68 must be moved a distance corresponding substantially to the length of one of the carriages 38, and this is accomplished with a relatively short stroke of the operating rack 62 by reason of the differential gearing connecting the rack 62 with the indexing rack 68. It will be apparent upon considering Figure 9 that the rack 62 must be moved in the direction of the arrow 77 to effect an indexing movement of the rack 68, and this is accomplished by admitting fluid under pressure into the cylinder 60 at the rear side of the piston 61. During this forward movement of the piston 61 in the cylinder 60, the forward end of the latter is connected to the exhaust so as not to interfere with the forward movement of the piston. When the piston 61 reaches the end of its forward stroke in the cylinder 60, the desired indexing movement of the rack 68 is completed, and the rack 68 is returned to its rearwardmost position shown in Figure 9 by introducing fluid under pressure into the cylinder 60 at the front end of the piston 61. During the rearward movement of the piston 61 in the cylinder 60, the rear end of the latter is connected to the exhaust.

Upon reference to Figure 1, it will be noted that the operation of the piston 61 is controlled by means of a pair of solenoid operated valves, designated by the reference characters 78 and 79. As will be more fully hereinafter set forth, when the valve 78 is energized it connects the rear end of the cylinder 60 to a source of fluid under pressure, and when it is deenergized, it connects the rear end of the cylinder to the exhaust. The valve 79 controls the forward end of the cylinder 60 and is energized to connect the forward end of the cylinder with a source of fluid under pressure when the valve 78 is deenergized. It will, of course, be understood that the two valves are automatically operated in timed relation to the other instrumentalities of the fixture so as to effect the indexing movement at the proper interval.

Figure 18:
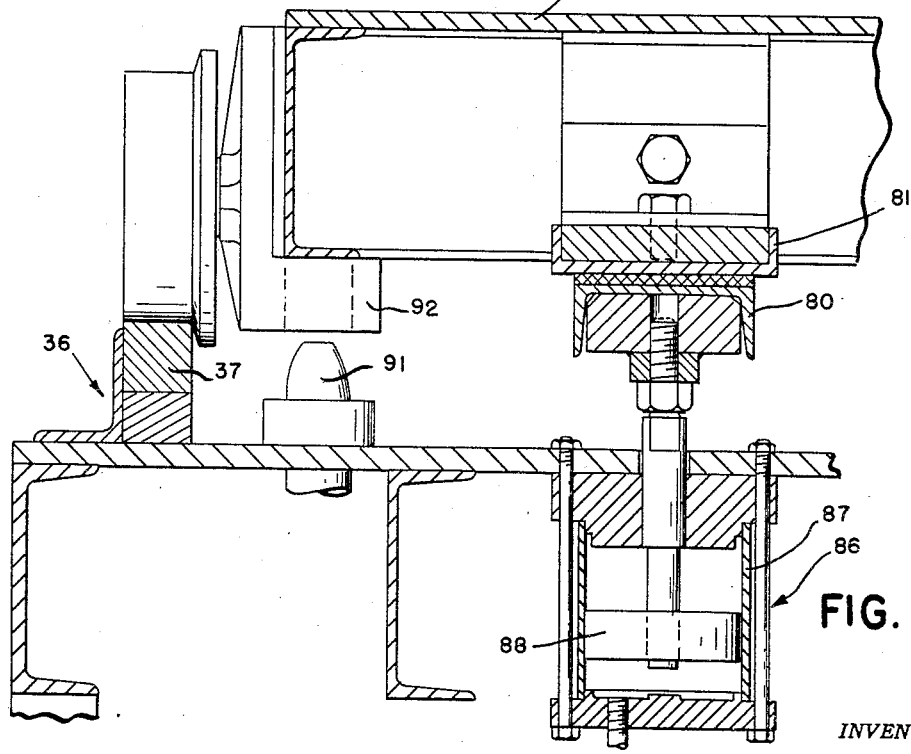
Figure 18 is a sectional view taken on the line 18—18 of Figure 17.

Upon reference to Figures 15, 17 and 18, it will be noted that movement of the carriages 38 along the track 37 of the welding conveyer 36 by the indexing mechanism is resisted by a plurality of brakes having elongated brake shoes 80 extending longitudinally of the welding conveyer in positions permitting the carriages to move over the shoes. In the present instance, one brake shoe is supported at each of the three stations 46, 47 and 48 and are yieldably urged into frictional engagement with pressure plates 81 secured to the bottom surfaces of the carriages 38 by means of springs 82 acting on the bottom surfaces of the shoes 80. As shown in Figure 17, the springs 82 are spaced from each other longitudinally of the brake shoes and are supported by studs 83 with the opposite ends respectively engaging the brake shoes and the frame structure for the welding conveyer. It will also be observed from Figure 17 that the braking torque resulting from engagement of the shoes 80 with the carriages 38 is prevented from moving the shoes in the direction of advancement of the carriages by an abutment 84 depending from each carriage and engageable with the rear side of a cooperating abutment 85 extending upwardly from the welding conveyer frame structure.

Thus, from the foregoing, it will be seen that the shoes 80 exert a braking action on the carriages 38 during the indexing movement thereof and overrunning of the carriages at the end of the indexing movement is resisted. In order to insure stopping of the carriages at the end of the indexing movement thereof, provision is made for moving the brake shoes upwardly into engagement with the carriages in timed relation to the indexing movement. As shown in Figures 17 and 18, the forward end of each brake shoe 80 is operatively connected to a fluid pressure actuated device 86 comprising a cylinder 87 and a piston 88 reciprocably mounted in the cylinder. The cylinders 87 are mounted on the frame structure of the welding conveyer with the axes thereof extending vertically and the pistons 88 are respectively connected to the forward ends of the brake shoes 80. Fluid under pressure is supplied to the lower ends of the cylinders 87 to move the brake shoes upwardly into engagement with the carriages 38 by a solenoid actuated valve 89 (Figure 1) movable to its open position at the end of the indexing movement of the carriages by energizing the solenoid associated with the valve in a manner to be more fully hereinafter described. As will also be set forth below, the solenoid is deenergized after the carriages 38 are arrested by the brake shoes 80 and the valve 89 exhausts the lower ends of the cylinders 87 to permit return movement of the pistons 89.

At the end of the indexing movement of the carriages 38, the three carriages at the welding stations 46, 47 and 48 are raised off the track 37 to register the work on the carriages with the welders by lifting devices 90 having elevating plungers 91 engageable with the undersides of the carriages. Upon reference to Figure 15, it will be noted that the upper ends of the plungers 91 are engageable in sockets 92 mounted on the undersides of the carriages 38. It follows, therefore, that the carriages 38 must be positioned at the end of each indexing movement with the sockets 92 in alignment with the upper ends of the plungers 91. For accomplishing the above result, I provide a latch 93, shown in Figure 19, as comprising a latch arm 94 and a fluid pressure device 95 for operating the arm 94. The latch arm 94 is pivoted at its rear end on the frame structure of the welding conveyer and is provided with a hook 96 at the forward end movable into the path of travel of the carriages 38 by the device 95. The latch 93 is positioned adjacent the delivery end 42 of the welding conveyer 36 and the hook 96 at the swinging end of the latch arm 94 engages the rear end of the carriage at the final welding station 48. The construction is such that the hook 96 forms a positive stop for the carriages on the welding conveyer and positions the latter carriages with the sockets 92 in registration with the upper ends of the elevating plungers 91.

The latch arm 94 is swung upwardly to position the hook in operative relation to the forwardmost carriage on the welding conveyer by the fluid pressure operated device 95 during the interval the carriages approach the end of their indexing movement. Referring again to Figure 19, the device 95 comprises a cylinder 97 and a piston 98 reciprocably mounted in the cylinder. The opposite ends of the cylinder 97 communicate with a solenoid operated valve 99 which is energized in timed relation to the indexing movement of the carriages 38 to connect the lower end of the cylinder 97 to a source of fluid under pressure and to connect the opposite end of the cylinder to the exhaust. As a result, the piston 98 is moved in an upward direction in the cylinder 97 and the latch arm 94 is swung in a corresponding direction by the piston 98 to locate the stop in the path of advancement of the carriages. After the latch 93 serves its purpose, the solenoid operated valve is deenergized and the operation of the device 95 is reversed to move the latch arm 94 out of the path of travel of the carriages. The manner in which the solenoid operated valve 99 is controlled will be set forth more in detail in the following description.

After the carriages 38 are indexed along the welding conveyer and the latch 93 is operated to position the carriages 38 relative to the elevating plungers 91, the latter are raised to engage the upper ends thereof in the sockets 92 on the carriages and lift the carriages at the welding stations 46, 47 and 48 toward the welders. As shown in Figures 2 and 15, six lifting devices 90 are provided at each of the three stations 46, 47 and 48. The six lifting devices 90 at each welding station are positioned so that three lifting devices are positioned at each side of the registering carriage 38 and are spaced from each other longitudinally of the welding conveyer so as to engage the carriage at points adjacent opposite ends and at points intermediate the ends. It will also be noted that the lifting devices 90 at one side of the welding conveyer are positioned directly opposite the lifting devices at the opposite side of the latter conveyer and, accordingly, it may be said that the lifting devices are arranged in pairs with the devices of each pair positioned directly opposite each other.

Referring again to Figure 15, it will be noted that the lifting devices of each pair are operatively connected by means of a transverse shaft 100 supported intermediate the ends by a casing 101 and having the opposite end portions journaled in bearings formed in the housings 102 of the lifting devices. Secured to each end of each of the transverse shafts 100 is a pinion 103 located in the housings 102 and meshing with rack teeth formed on the elevating plungers 91. As shown in Figure 16, the plungers are mounted in the housings 102 for vertical sliding movement and the plungers 91 of each pair of lifting devices are operated by rotating the transverse shafts 100. In the present instance, the shafts 100 are rotated in one direction to simultaneously raise the plungers 91 at each welding station and are rotated in the opposite direction to simultaneously lower the plungers 91.

For rotating the shafts 100, a pinion 104 is rotatably mounted in each housing 101 and is secured to the shaft 100 extending through the latter housing. The housings 101 are secured to the frame structure of the welding conveyer in alignment with each other and are provided with guide channels 105 for slidably supporting a sectional rack 106 in a position to mesh with the pinions 104. Thus, it will be noted that reciprocation of the rack 106 imparts a rotative movement to the shafts 100 in opposite directions to raise and lower the elevating plungers 91. Upon reference to Figures 13 and 14, it will be seen that the rack 106 is reciprocated by a double acting fluid pressure operated device 107 secured to the forward end of the welding conveyer and comprising a cylinder 108 and a piston 109 reciprocably mounted in the cylinder. The piston 109 is provided with a rod 110 extending through the front end of the cylinder 108 and connected at its forward end to a cross head 111 intermediate the ends of the latter. The opposite ends of the cross head are connected to a second cross head 112 at the rear end of the device 107 by rods 113 extending along opposite sides of the cylinder 108. The second cross head 111, in turn, is connected to the forward end of the rack 106 so that forward movement of the piston 109 moves the rack 106 in a corresponding direction to raise the elevating plungers 91, and rearward movement of the piston 109 operates the rack 106 to lower the elevating plungers.

The opposite ends of the cylinder 108 are alternately connected to a source of fluid under pressure and to an exhaust by a pair of solenoid operated valves 114 and 115, diagrammatically shown in Figure 1. The valve 114 controls the rear end of the cylinder 108, and the valve 115 controls the front end of the cylinder. The arrangement is such that when the valve 114 is energized it supplies fluid under pressure to the rear end of the cylinder 108 and moves the rack 106 forwardly to raise the plungers 91 of the elevating devices 90. During this interval, the forward end of the cylinder 108 is connected to the exhaust and remains in this position until the work has been welded. Upon completion of the welding operation, the solenoid valve 114 is operated to exhaust the rear end of the cylinder 108 and the solenoid valve 115 is energized to connect the forward end of the cylinder 108 to the source of fluid under pressure. As a result, the elevating plungers are lowered and the carriages 38 are returned to positions on the tracks 37 of the welding conveyer. The manner in which the solenoid operated valves 114 and 115 are operated in proper timed relation to each other and to the remaining instrumentalities of the fixture will be fully described in connection with the operation of the fixture.

*Welder control units*

The control units 51, 52, 55, 56, 59 and 60 are operated during the interval the carriages 38 are supported in their uppermost positions by the elevating devices 90 to weld the work supported by the respective carriages. Before describing the welding units in detail, it may be pointed out that as the carriages 38 are raised from the welding conveyer 36 to their uppermost positions, the work on the respective carriages is clamped against a plurality of electrodes 116 fixed to the carriages in positions directly opposite the electrodes on the welders to be presently described. In the present instance, a plurality of clamps are provided for accomplishing the above result, and one of these clamps is designated in Figure 20 by the reference character 117. The clamps 117 are secured to the superstructure 118 of the welding conveyer frame, and each clamp is provided with a head 119 adapted to engage a part of the work. It will be observed from Figure 20 that the heads 119 of the clamps are supported for vertical sliding movement and are normally yieldably urged into clamping engagement with the work by means of springs 120.

The electrodes 116 are grounded on the carriages 38, and the carriages are connected in the welding circuit by means of electrical contact members 121 secured at their lower ends to the carriages in alignment with suitable sockets 122 depending from the superstructure 118 of the welding conveyer frame. The sockets 122 are connected in the welding circuit by means of a jumper 123. The above construction is such that when the carriages 38 are raised to their uppermost positions by the lifting devices 90, the work on the respective carriages is clamped against the carriage electrodes 116 by the clamps 117, and the electrical contact members 121 on the carriages engage in the sockets 122 to connect the electrodes 116 in the welding circuit.

As stated above, each group of welders at the several welding stations is independently controlled by a control unit. One of the control units is shown in Figures 3 to 5, inclusive, and comprises a distributing valve 124. Upon reference to Figure 3, it will be noted that the distributing valve 124 includes a plate 125 having a plurality of circumferentially spaced radially extending passages 126 in the peripheral portion thereof. The outer end of each passage 126 communicates with a distributing conduit 127 and the latter, in turn, communicates with a plurality of welders 128. Each welder 128 is provided with a cylinder 129 and a piston 130 reciprocably mounted in the cylinder. In the present instance, the upper end of the cylinder communicates with the distributing passage 127, and the piston 130 is moved downwardly relative to the cylinder by the action of the fluid pressure admitted to the upper end of the cylinder through the distributing conduit 127. Downward movement of the piston in the cylinder is resisted by means of a spring 131 so that when the cylinder is exhausted the piston will be returned to its uppermost position by the spring. The piston 130 is operatively connected to an electrode 132 by means of a plunger 133 in such a manner that when fluid pressure is admitted to the upper end of the cylinder 129, the electrode 132 cooperates with the registering electrode 116 to clamp the work therebetween.

Fluid under pressure is supplied to the distributing conduits 127 by a rotatable arm 134 having a passage 135 therethrough and supported for rotation beneath the plate 125. The lower end of the passage 135 communicates with a source of hydraulic fluid medium under pressure, and the upper end of the passage 135 successively communicates with the inner ends of the passages 126 during rotation of the arm 134. The arm 134 is rotated by means of an electric motor 136 having a drive shaft 137 operatively connected to the arm through the medium of reduction gearing 138. Upon reference to Figure 2, it will be noted that the electric motor 136 for each control unit is arranged in an independent circuit 139 with a switch 140. Although the switches 140 are diagrammatically illustrated in Figure 2 as being located adjacent the electric motor 136, nevertheless, in the actual construction these switches are in the form of normally open limit switches and are positioned to be closed by the carriages 38 as they are raised by the elevating devices 90.

It follows from the above that when the carriages are raised off of the welding conveyer, the switches 140 are closed so that by the time the work at the several welding stations is supported in registration with the electrodes 132 of the welders 128, the distributing arm 134 of each control unit is rotated. As the distributing arm 134 rotates, hydraulic fluid medium is successively introduced into the welders 128 of each group, and the electrodes 132 of the respective welders are moved downwardly to cooperate with the electrodes 116 to clamp the work therebetween. After the electrodes 132 of the several groups of welders are moved downwardly into engagement with the work, the welding circuits are closed to effect the desired welds. In the present instance, each welder control unit comprises a switch 141, and this switch closes and opens the welding circuit during the interval each distributing conduit 127 is connected to the source of hydraulic fluid medium. In other words, only one switch 141 is provided for each control unit.

In the present instance, the switch 141 at each control unit is operated by pneumatic pressure supplied to the switch through the medium of a supply conduit 142, shown in Figure 5 of the drawings. It will also be noted from Figure 5 that the switch comprises a piston 143 mounted for reciprocation and having a contact member 144 at the forward end adapted to bridge a pair of stationary contacts 145 electrically connected in the welding circuit. The contact member 144 is moved into engagement with the contacts 145 by means of air under pressure supplied to the switch closing chamber 146, and the contact member 144 is moved out of engagement with the stationary contacts 145 by means of air under pressure supplied to the switch opening chamber 147.

Upon reference to Figure 5, it will be noted that the switch closing chamber 146 communicates with the pneumatic pressure supply line 142 through the medium of a conduit 148 and that a valve 149 controls communication through the passage 148. The valve 149 is in the form of a piston having an annular groove 150 extending around the periphery thereof and adapted to establish communication between the supply line 142 and the passage 148 when the valve piston is moved to its forwardmost position (shown in Figure 5). The valve piston 149 is moved to its forwardmost position by a rotatable operating disc 150' connected to the distributing arm 134 of each unit for rotation with the distributing arm. Upon reference to Figure 4, it will be noted that a plurality of circumferentially spaced cams 151 extend radially outwardly from the periphery of the disc 150' and successively operate to move the valve piston 149 to its open position through the medium of a lever 152. The lever 152 is rockably supported on the control unit and is successively operated by the cams 151 to move the valve piston 149 in a forward direction to the position shown in Figure 5. The number of cams 151 correspond to the number of distributing conduits 127, and the arrangement is such that each time one of the conduits 127 communicate with the hydraulic fluid medium under pressure, the valve 149 is operated by one of the cams 151 to supply pneumatic pressure to the switch closing chamber 146.

It is, of course, important that closing of the welding circuit is delayed until the electrodes 132 of the welders engage the work and, accordingly, the rate of pressure rise in the switch closing chamber 146 is controlled by a needle valve 153. At the same time that fluid under pressure is admitted to the switch closing chamber 146, fluid pressure is also admitted through the passage 154 to an accumulating chamber 155 which communicates with the switch opening chamber 147 through the medium of a passage 156, and the rate of pressure rise in the switch opening chamber 147 is controlled by a needle valve 157. In this connection, it will be noted that the area of the switch operating piston 143 exposed to the pressure in the chamber 147 is greater than the area of the switch operating piston exposed to the pressure in the switch closing chamber 146. Therefore, when the pressure in the switch opening chamber 147 approaches the pressure in the switch closing chamber 146, the switch contact member 144 is moved out of engagement with the stationary contacts 145 to open the welding circuit. In order to regulate the duration of the weld, the pressure rise in the switch opening chamber 147 is controlled by a needle valve 157 located to regulate the flow of fluid under pressure into the accumulating chamber 155. The duration of the weld will depend to some extent upon the thickness of the work to be welded and, in the present instance, the welding time of each group of welders may be different due to the fact that independent control units are provided for each group of welders.

The switch 141 is exhausted during the interval the distributing arm 34 advances from one passage 126 to the next adjacent passage and this is accomplished by moving the valve piston 149 in a rearward direction from the position shown in Figure 5. Upon reference to Figure 5, it will be noted that a second accumulating chamber 158 communicates with the accumulating chamber 155 through the medium of a passage 159 and also communicates with a chamber 160 located at the forward end of the valve piston. The area of the forward end of the valve piston exposed to the pressure in the chamber 160 is greater than the area of the valve piston acted upon by the fluid pressure flowing through the supply conduit 142 and, accordingly, the valve piston is moved rearwardly when the pressure in the chamber 160 approaches the line pressure. It will, of course, be understood that return movement of the valve piston 149 must be delayed until the welding circuit is open, and in order to insure this operation, a needle valve 161 is provided in the passage 159 to control the rate of pressure rise in the accumulating chamber 158. When the valve piston 149 assumes its rearwardmost position, the chamber 160 communicates with an exhaust port 162 and the supply passage 148 also communicates with the exhaust port 162 by means of a passage 163. When the parts are in the above relative position, the switch is exhausted and conditioned for the next operation.

Upon reference to Figure 4 of the drawings, it will be noted that when the operating disc 150' approaches the end of one complete revolution, a normally open limit switch 164 is closed by means of a rock arm 165. The rock arm is pivotally supported intermediate the ends thereof adjacent the disc 150' of each control unit, and one end of the arm extends into the path of travel of a projection 166 extending from the disc 150' for operation by the latter. As the arm 165 is swung about its pivotal connection by the projection 166, the other end of the rock arm engages a limit switch 164 to close the latter. As will be more fully hereinafter described, the limit switch 164 on each control unit must be closed before the solenoid operated valve 115 is actuated to return the carriages 38 to positions on the welding conveyer.

*Transfer conveyers*

Figure 22:
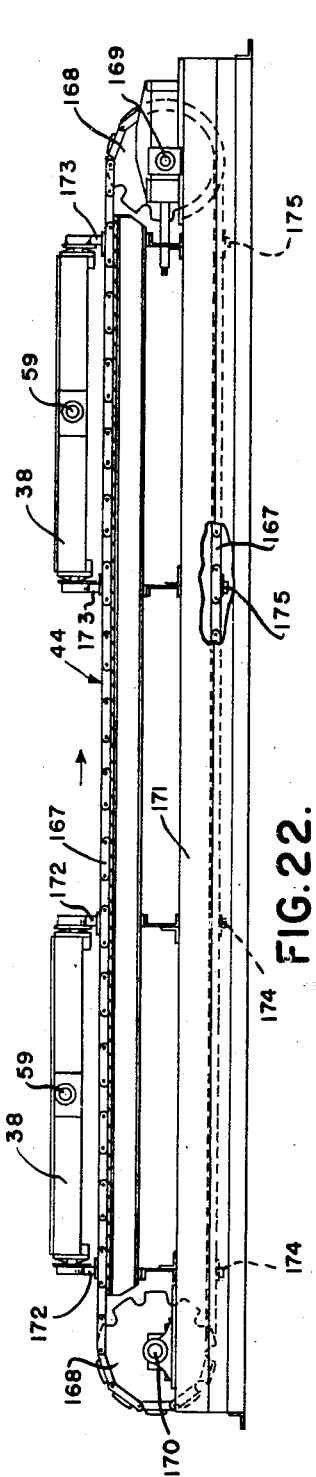
Figure 22 is a side elevational view partly in section of the cross conveyer shown in Figure 21.

Upon return movement of the carriages 38 to positions on the welding conveyer track 37, the indexing rack 60 is operated in a manner to be more fully hereinafter set forth to advance the carriages in a forward direction relative to the welding conveyer. The carriage 38 at the final welding station 40 is moved off of the welding conveyer onto the transfer conveyer 44. As pointed out above, the transfer conveyer 44 is substantially the same in construction as the transfer conveyer 41 and, therefore, a description of one transfer conveyer will suffice for both. Upon reference to Figures 21 to 25, inclusive, it will be noted that the transfer conveyer 44 comprises a pair of laterally spaced chains 167 having the opposite ends respectively reeved around sprockets 168. The sprockets 168 at one end of the conveyer are secured to a shaft 169, and the sprockets at the opposite end of the conveyer are secured to a shaft 170. Both shafts are suitably rotatably supported on frame structure 171 forming a part of the transfer conveyer 44. Upon particular reference to Figure 22, it will be noted that a pair of tracks 172 and 173 extend transversely of the conveyer chains and are secured to the upper sides of the chains. A second pair of tracks 174 and 175 are secured to the lower sides of the chains 167 in parallel relationship to the first pair of tracks. As shown in Figure 22, the pair of tracks 174 are secured to the conveyer chains in vertical alignment with the pair of tracks 172, and the pair of tracks 175 are arranged in vertical alignment with the tracks 173. It should, also, be noted that the distance between adjacent pairs of tracks on the transfer conveyer 44 is equal to the distance between the track 37 on the loading conveyer 35 and the track 37 on the welding conveyer 36. In addition, it will be noted that the rails of each track on the transfer conveyer 44 are spaced apart a distance corresponding to the spacing between the rails of the tracks 37.

The above arrangement is such that when the transfer conveyer 44 is in the position thereof shown in Figures 1, 21 and 22, the track 173 registers with the track 37 of the loading conveyer, and the track 172 registers with the track 37 of the welding conveyer. The tracks on the transfer conveyer 41 are similarly numbered and due to the fact that the conveyer 41 is similar in construction to the conveyer 44, it follows that when the transfer conveyers are in the relative positions shown in Figure 1, the track 173 on the conveyer 41 registers with the delivery end 39 of the track 37 on the loading conveyer, and the track 172 registers with the entrant end 40 of the track 37 on the welding conveyer. The transfer conveyers are in the relative positions shown in Figure 1 at the start of the indexing movement of the carriages 38 on the welding conveyer with the result that the carriage 38 at the final welding station 48 is moved onto the track 172 of the transfer conveyer 44, and a carriage 38 is moved off of the track 172 on the transfer conveyer 41 to a position at the first welding station 46 on the welding conveyer.

Movement of a carriage 38 onto the track 172 of the transfer conveyer 44 effects a movement of the transfer conveyer in the direction of the arrow in Figure 22 to register the track 172 with the entrant end 43 of the track 37 on the loading conveyer. The transfer conveyer 44 is moved in the direction of the arrow in Figure 22 by means of a double-acting fluid pressure operated device 176 comprising a cylinder 177 and a piston 178 reciprocably mounted in the cylinder. The piston 178 is connected to one end of a rack 179 by means of a connecting rod 180 and the opposite or free end of the rack meshes with a pinion 181 secured to a shaft 182 which in turn is supported for rotation in a casing 183. Upon reference to Figure 27, it will be noted that the free end of the rack 179 is held in mesh with the pinion 181 and is guided by a downwardly opening channel-shaped guide 184 secured to the housing 183. Positioned within the housing 183 on the shaft 182 is a driving gear 185, shown in Figures 21 and 26 as meshing with a gear 186 also located in the housing 183 and secured to a stub shaft 187. The driving gear 185 is connected to the shaft 182 by a uni-directional clutch having a member 188 secured to the shaft 182 for rotation with the latter and projecting into a circumferentially extending cam groove 189 formed in the hub of the gear 185. A spring 190 normally urges the outer end of the member 188 into the cam groove 189 and the latter terminates in an abrupt shoulder 191 adapted to abut the adjacent side of the member 188 when the shaft 182 is rotated in a clockwise direction, as viewed in Figure 26. As a result, the driving gear 185 is rotated as a unit with the shaft 182 when the latter is rocked in a clockwise direction by movement of the rack 179 in the direction of the arrow in Figure 26. However, the shape of the cam groove 189 is such that rotation of the shaft 182 in a counterclockwise direction by return movement of the rack 179 merely acts to force the member 188 inwardly against the action of the spring 190 and no motion is imparted to the driving gear 185 or to the gear 186.

As stated above, the gear 186 is secured to the shaft 187 and the latter drives a sprocket 192 which, in turn, drives a sprocket 193 through the medium of a chain 194. The sprocket 193 is secured to the shaft 170 of the transfer conveyer 44 and serves to drive the conveyer chains 167 to move the conveyer in the direction of the arrow 195 in Figure 21 when the rack 179 is moved in the direction of the arrow 196, in the same figure, to rotate the driving gear 185 in a clockwise direction. In connection with Figure 26, it is to be understood that the carriage 38 on the track 173 is moved off the transfer conveyer 44 onto the loading conveyer 35 before the transfer conveyer 44 is moved in the direction of the arrow 195 to locate the track 172 and carriage supported thereby in registration with the loading conveyer. The means for moving the carriage off the track 173 onto the loading conveyer in proper timed relation to the remaining operations will be presently described. It will suffice to point out at this time that the above construction is such that one reciprocation of the rack 179 indexes the transfer conveyer 44 to move one track from a position in registration with the delivery end 42 of the welding conveyer to the entrant end 43 of the loading conveyer. The indexing movement of the transfer conveyer is always in the direction of the arrow 195 because return movement of the operating rack 179 has no effect on the driving gear 185.

The piston 178 is moved in opposite directions in the cylinder 177 by fluid under pressure alternately admitted to opposite ends of the cylinder 177 from a suitable source of supply. The operation of the piston 178 in the cylinder is controlled by a pair of solenoid operated valves 197 and 198, diagrammatically shown in Figure 1. These valves are normally open to connect opposite ends of the cylinder 177 to the exhaust. However, when the valve 197 is energized it supplies fluid under pressure to the rear end of the cylinder 177 and moves the piston 178 in a forward direction to advance the rack 179 in the direction of the arrows 196 in Figures 21 and 26. As a result, the transfer conveyer 44 is moved in the direction of the arrow 195 in Figure 21 to shift the track 172 to a position in registration with the entrant end 43 of the loading conveyer. The valve 197 is then deenergized to connect the rear end of the cylinder to the exhaust and the valve 198 is energized to connect the forward end of the cylinder with the source of fluid pressure supply. As a result, the piston 178 is returned to move the rack 179 back to its initial starting position in readiness for the next advancing movement. The manner in which the solenoid operated valves are controlled to effect the desired operation of the piston 178 in the proper timed relation to the other instrumentalities of the apparatus will be more fully hereinafter set forth.

Referring briefly to the transfer conveyer 41, it will be noted from Figure 1 that this conveyer moves in a direction opposite the direction of movement of the conveyer 44, although, the indexing mechanism is the same in both instances. In other words, as the conveyer 44 is indexed in the direction of the arrow 195 in Figure 1 to move the track 172 from a position in registration with the delivery end 42 of the welding conveyer to the entrant end 43 of the loading conveyer, the conveyer 41 is indexed in the opposite direction, indicated by the arrow 199 in Figure 1, to move the track 173 thereon from the delivery end 39 of the loading conveyer to the entrant end 40 of the welding conveyer. The operation of the conveyer 41 is independently controlled by a pair of solenoid operated valves 200 and 201, diagrammatically shown in Figure 1. The solenoid valve 200 normally connects the rear end of the indexing cylinder, associated with the conveyer 41, to the exhaust and is energized to supply fluid pressure to the rear end of the cylinder. During energization of the valve 200, the valve 201 connects the forward end of the cylinder to the exhaust with the result that the piston and associated rack are advanced to index the conveyer 41 or, in other words, to move the track 173 from the delivery end of the loading conveyer to a position in registration with the entrant end of the welding conveyer. Upon completion of the indexing movement of the conveyer 41, the solenoid valve 200 is opened to exhaust the rear end of the cylinder and the valve 201 is energized to supply fluid under pressure to the forward end of the cylinder. As a result, the indexing piston for the conveyer 41 is retracted and the associated rack is returned to its initial starting position in readiness for the next indexing movement of the conveyer 41. The solenoid valves 200 and 201 are operated in proper sequence with the other parts of the fixture and the manner in which this is accomplished will be presently described.

The transfer conveyer 44 differs from the conveyer 41 in that it is provided wth a brake 202 arresting movement of the carriages as they are moved off the welding conveyer onto the transfer conveyer 44. Upon reference to Figure 23, it will be noted that the brake 202 is in the form of an elongated shoe located beneath the conveyer 44 in a position to engage the undersides of the carriages 38 as they are moved onto the transfer conveyer. In detail, the opposite ends of the brake shoe are respectively pivotally connected to the upwardly extending arms 203 of a pair of bell crank levers 204 having the central portions pivoted on the frame structure 171 of the conveyer 44. The other arms of the bell crank levers are pivotally connected to a rod 205 having the rear end connected to a piston 206 reciprocably mounted in a cylinder 207. The arrangement is such that when the piston 206 is moved in a forward direction in the cylinder 207, the bell crank levers 204 are swung about their pivotal connections with the frame 171 in a counterclockwise direction to raise the brake into frictional engagement with the carriage and retard the motion of the latter.

The piston 206 is successively moved in opposite directions in the cylinder 207 to apply and release the brake 202 by fluid under pressure. The opposite ends of the cylinder 207 are alternately connected to a source of fluid under pressure and to an exhaust by the solenoid operated valve 89 previously described as operating the brake shoes 80. When the valve 89 is energized, it connects the rear end of the cylinder 207 to the source of fluid under pressure and connects the forward end of the cylinder 207 to an exhaust. As a result, the piston 206 is moved forwardly and the brake 202 is applied. On the other hand, when the solenoid valve 89 is deenergized, the front end of the cylinder 207 is connected to the source of fluid pressure and the rear end of the cylinder is connected to the exhaust. This causes the piston 206 to move rearwardly and release the brake 202 from the associated carriage 38. Thus, it will be seen that the brake 202 is operated at the same time the brake shoes 80 are operated to retard the indexing movement of the carriages 38 on the welding conveyer.

In order to take up any shock resulting from movement of the carriages onto the conveyer 44, I provide a bumper 209, shown best in Figure 32 of the drawings. The bumper 209 is mounted on a frame 210 (Figure 23) in a position to be engaged by the members 59 projecting from the forward end of the carriages as the latter are moved off the welding conveyer onto the transfer conveyer 44. In detail, the bumper comprises a plunger 211 supported in alignment with the projecting members 59 on the carriages for engagement thereby and having a piston 212 reciprocably mounted in a cylinder 213. The forward end of the cylinder 213 communicates with the rear end of a reduced chamber 214 having the forward end thereof communicating with the upper end of a cylinder 215 through a restricted port 216. A piston 217 is reciprocably mounted in the cylinder 215 and the lower end of the latter communicates with a source of fluid under pressure. The cylinder 215 and associated piston 217 act as a cushion or shock absorber for the plunger 211 to restrict movement of the latter by the inertia of the carriage contacting the same. In this connection, attention is called to the fact that the flow of fluid medium from the cylinder 213 to the chamber 214 is restricted by a valve 218 movable into the chamber 214 by the piston 212. As shown in Figure 32, the valve member 218 is tapered to gradually increase the restriction as the piston 212 approaches the chamber 214.

Fluid under pressure is alternately supplied to and exhausted from the lower end of the cylinder 215 by a solenoid operated valve 219, shown in Figure 1. As will be more fully hereinafter set forth, the valve 219 is energized to supply fluid pressure to the lower end of the cylinder 215 in response to movement of the transfer carriage 44 in a direction toward the entrant end of the loading conveyer. As the transfer conveyer 44 is advanced in the above direction, the valve 219 is deenergized to exhaust the lower end of the cylinder 215 and thereby condition the bumper for the next operation. It may be pointed out at this time that a bumper 220 is associated with the conveyer 41 in a position to engage the carriages 38 as the latter are moved off the delivery end 39 of the loading conveyer onto the transfer conveyer 41. This bumper, however, merely has a simple shock absorber action and is not connected to the fluid pressure supply.

As stated above, when a carriage 38 is positioned on the transfer conveyer 44 from the delivery end of the welding conveyer, the transfer conveyer 44 is indexed in the direction of the arrow 195 in Figure 21 to locate the carriage in the position shown in Figure 1 in registration with the entrant end 43 of the loading conveyer 35. In the present instance, movement of the transfer conveyer 44 in the above direction is retarded as the carriage approaches a position in registration with the loading conveyer 35. Retarding of the transfer conveyer 44 is accomplished by means of a brake 221 associated with one end of the shaft 169. Upon reference to Figure 29, it will be noted that the brake 221 comprises a brake drum 222 secured to the shaft 169 and having an annular flange adapted to be engaged by a pair of brake shoes 223. The brake shoes 223 are respectively pivotally connected to a pair of arms 224 pivotally supported at their lower ends on opposite sides of the brake drum and connected together at the upper ends by means of a fluid pressure operated device 225. In the present instance, the brake shoes are normally urged into frictional engagement with the annular flange on the brake drum by means of a pair of springs 226 carried by a rod 227 and acting upon the upper end portions of the arms 224 to urge the latter toward each other.

The actuator 225 comprises a cylinder 226 having a pair of pistons 227 reciprocably mounted therein and respectively pivotally connected to the upper ends of the arms 224. The adjacent ends of the pistons 227 cooperate with one another and with the cylinder to form a chamber 228 therebetween. This chamber is adapted to be connected to a source of fluid under pressure through the medium of a port 229, and the arrangement is such that when pressure builds up in the chamber 228, the brake shoes are released from frictional engagement with the brake drum. The flow of fluid under pressure to the chamber 228 between the pistons 227 is controlled by a solenoid operated valve 230, diagrammatically shown in Figure 1 of the drawings. As will be more fully hereinafter set forth, the valve 230 is energized at the same time the solenoid operated valve 219 is energized to charge the bumper 209. In other words, the valve 230 is energized as a carriage 58 is moved off the delivery end 42 of the welding conveyer onto the transfer conveyer 44. Energization of the valve 230 supplies fluid under pressure to the chamber 228 and moves the pistons 227 outwardly in the cylinder 226 to release the brake shoes 223 from frictional engagement with the drum 222. The valve 230 remains energized until the end of the indexing movement of the transfer conveyer 44 to position the carriage 58 in registration with the entrant end 43 of the loading conveyer. At this time, the valve 230 is deenergized and the brake 222 is applied by the springs 226. The manner in which the valve 230 is automatically operated to effect the operation of the brake 222 will be more fully hereinafter described in connection with the operation of the fixture.

It may be pointed out at this time that the transfer conveyer 41 is provided with a similar brake to retard the indexing movement of the conveyer 41 as the carriage on the latter approaches a position in registration with the entrant end 40 of the welding conveyer. The brake for the conveyer 41 is controlled by a solenoid operated valve 231 diagrammatically shown in Figure 1. As will be more fully hereinafter set forth, the valve 231 is energized prior to the indexing movement of the conveyer 41 and is deenergized to apply the brake as the conveyer 41 approaches the end of its indexing movement.

It will be noted from the foregoing that it is essential to accurately align the tracks on the transfer conveyers with the tracks 37 on the loading and welding conveyers at the end of each indexing movement. For accomplishing this result, each of the conveyers is provided with a pair of latch devices, designated in Figure 21 by the reference character 232. It will be observed from Figure 21 that the latch devices are spaced from each other transversely of the transfer conveyers. A pair of latches associated with the transfer conveyer 44 are located to form an abutment for engagement with the track on the conveyer 44 as this track is indexed to a position in registration with the entrant end 43 of the loading conveyer. The pair of latches associated with the transfer conveyer 41 are positioned to engage a track on the conveyer 41 as this track assumes a position in registration with the entrant end 40 of the welding conveyer 36.

One of the latch devices is shown in Figure 25 and comprises a latch arm 233 pivotally supported at one end for vertical swinging movement and having a hook 234 at the opposite end forming an abutment for a rail of one of the tracks on one of the transfer conveyers. The hook 234 is normally urged upwardly into the path of travel of the track on the transfer conveyer by means of a spring 235 acting on the underside of the arm 233 intermediate the ends thereof. The extent of upward swinging movement of the arm 233 is limited by a stop 236 in the form of a bolt secured to a fixed support below the arm 233 and having the upper end projecting through the arm. As shown in Figure 25, the upper end of the bolt is provided with a head which forms a positive stop for engagement with the arm to limit its upward movement by the spring 235.

The free end of the arm 233 is moved out of the path of travel of the tracks on the transfer conveyer by means of a fluid pressure actuated device 237 comprising a cylinder 238 and a piston 239 reciprocably mounted in the cylinder. The piston 239 is pivotally connected to the free end of the arm 233 and is moved downwardly to swing the hook portion 234 of the arm 233 out of the path of travel of the tracks on the transfer conveyer by supplying fluid under pressure to the upper end of the cylinder 238. In the present instance, the solenoid operated valve 230 controls the flow of fluid under pressure into the upper ends of the pair of cylinders 238 associated with the transfer conveyer 44, and the solenoid operated valve 231, controls the flow of fluid under pressure to the upper ends of the latch cylinders 238 associated with the transfer conveyer 41. The manner in which the solenoid operated valves 230 and 231 are actuated to effect the above results will be described in detail in connection with the operation of the fixture. It will suffice to point out that when the two solenoid valves 230 and 231 are energized, the brakes 221 are released and the latches 232 are moved to their lowermost positions out of the path of travel of the transfer conveyers. On the other hand, when the two valves 230 and 231 are deenergized, the brakes 221 are applied by the springs 226' and the latches 232 are moved to their uppermost or operative positions by the springs 235.

*Unloading device*

In the present instance, the work is removed from the carriages 38 after the latter are moved onto the transfer conveyer 44 from the delivery end 42 of the welding conveyer. Upon reference to Figure 24, it will be noted that each carriage 38 is equipped with a plurality of spaced ejector plungers 240 supported for vertical reciprocation relative to the carriages and having the upper ends abutting the lower surface of the work at spaced points. The lower ends of the plungers extend below the bottom surface of the carriages and are provided with rollers 241. The rollers 241 cooperate with suitable cams 242 secured to the frame of the transfer conveyer 44 in positions to engage the rollers as the carriages are moved off of the welding conveyer onto the transfer conveyer 44. The cams 242 raise the plungers 240 and lift the work off of the carriages.

Referring now to Figure 30, it will be noted that the work is engaged by an unloading device 243 when it is raised off of the carriage by the ejector plungers 240. The unloading device 243 is suspended from a bar 244 and comprises a plurality of tongs 245 adapted to engage opposite sides of the work at points spaced longitudinally of the latter. The tongs 245 are manually operated to engage opposite edge portions of the work by means of a rock shaft 246 extending longitudinally of the unloading device intermediate the opposite side edges thereof. The shaft 246 is rockably supported in suitable bearings 247 secured to the frame structure of the unloading device and is connected to the tongs by rock arm 248. Upon reference to Figure 31, it will be noted that the rock arms 248 are secured to the shaft 246 and are connected to the arms of the tongs by means of rods 249. The arrangement is such that rocking movement of the shaft 246 in one direction by manipulation of the handle 250 swings the tongs into engagement with the work, and rocking movement of the shaft in the opposite direction releases the tongs from engagement with the work.

After the tongs are properly engaged with the work in the manner shown in Figure 31, the unloading device is raised by means of a fluid operated device 251 in the form of a cylinder 252 having a piston 253 reciprocably mounted in the cylinder. The opposite ends of the cylinder are alternately connected to fluid under pressure and to an exhaust through the medium of a manually operable valve 254, diagrammatically shown in Figure 30. The arrangement is such that when it is desired to raise the unloading device, fluid under pressure is admitted to the rear end of the cylinder 252 and the forward end of the cylinder is connected to the exhaust. As a result, the piston 253 is moved forwardly and applies a pull on the flexible cable 255. As shown in Figure 30, the flexible cable 255 is reeved around the pulleys 256 is connected to the opposite ends of the bar 244 in such a manner that this bar is raised upon forward movement of the piston 253 to lift the unloading device. It follows from the above that when the forward end of the cylinder 252 is connected to the fluid under pressure and the rear end of the cylinder is connected to the exhaust, the piston 53 moves in a rearward direction in the cylinder and lowers the unloading device.

The fluid operated device 251 and the pulleys 256 are supported on a frame member 257 which, in turn, is suspended from a track 258. The track 258 extends to the point of distribution of the work remote from the carriages 38 and permits transporting the unloading device with the work thereon to this point of distribution. It will, of course, be understood that the work is unloaded from the carriages 38 while the latter are supported opposite the delivery end 42 of the welding conveyer and before the transfer conveyer 44 is indexed to move the carriages in registration with the entrant end 43 of the loading conveyer.

*Loading Conveyer*

Figure 8:
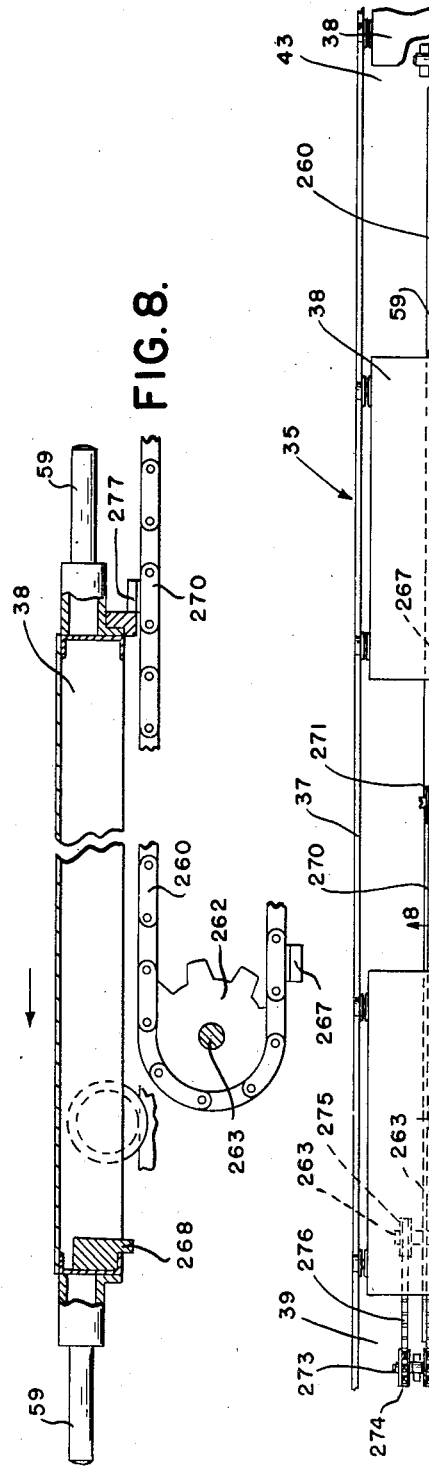
Figure 8 is a sectional view taken substantially on the line 8—8 of Figure 6.
Figure 6:
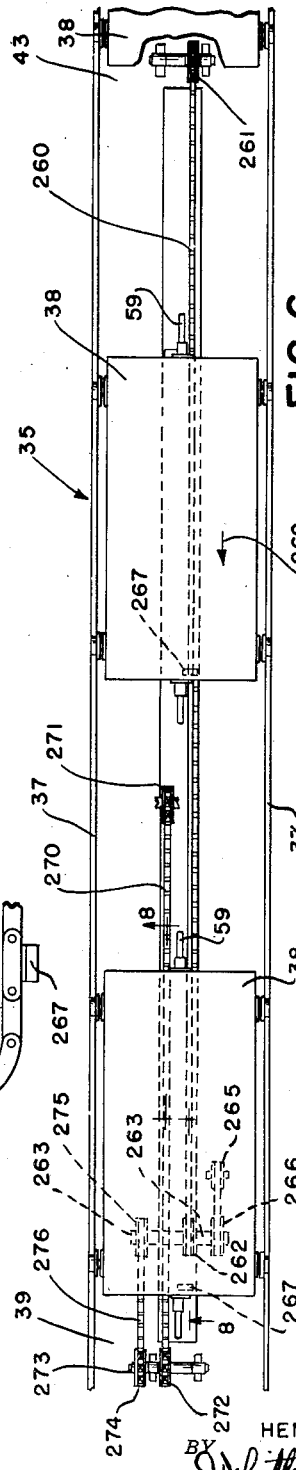
Figure 6 is a fragmentary plan view of the loading conveyer embodied in the fixture.
Figure 7:
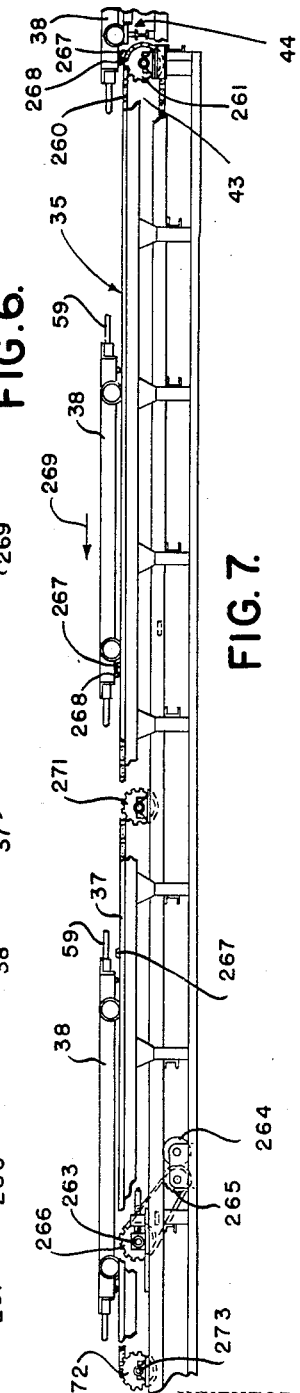
Figure 7 is a side elevational view of the loading conveyer shown in Figure 6 and having certain parts broken away for the sake of clearness.

The loading conveyer 35 is illustrated in Figures 6 to 8, inclusive, and comprises the track 37 on which the carriages 38 are supported. The several parts of the work to be welded together are applied to the carriages 38 as the latter are moved along the track 37 of the loading conveyer, and movement of the carriages along the loading conveyer is effected in timed relation to the indexing movement of the carriages along the welding conveyer. In detail, a continuous chain 260 extends for substantially the full length of the loading conveyer 35 between the rails of the track 37. The chain 260 is supported at the entrant end 43 of the loading conveyer by means of a sprocket 261 and is supported at the delivery end of the loading conveyer by means of a sprocket 262. The sprocket 262 is secured to a drive shaft 263 and the latter is rotated by an electric motor 264 through the medium of suitable reduction gearing. The power take-off shaft of the reduction gearing has a sprocket 265 secured thereto, and this sprocket is connected to a sprocket 266 secured to the drive shaft 263.

Upon reference to Figure 7, it will be noted that the forward portion of the chain 260 is positioned in such close proximity to the transfer conveyer 44 that the forward end of a carriage 38 on the transfer conveyer extends over the rear end portion of the chain 260. It will also be noted that a plurality of dogs 267 are secured to the chain at longitudinally spaced points and these dogs successively engage projections 268 depending from the rear ends of the carriages 38. The arrangement is such that as the chain 260 is moved in the direction of the arrow 269 in Figures 6 and 7, one of the dogs 267 engages the projection 268 on the carriage 38, supported by the transfer conveyer 44 opposite the entrant end 43 of the loading conveyer, and moves the carriage off of the transfer conveyer onto the track 37 of the loading conveyer. The carriage is advanced by the chain 260 until it assumes a position at the delivery end of the loading conveyer whereupon the dog 267 is released from the projection 268.

The carriage 38 advanced in the above manner along the loading conveyer is moved onto the transfer conveyer 41 at the proper time interval by a second chain 270 positioned adjacent the chain 260. The forward portion of the chain 270 is supported intermediate the ends of the loading conveyer on an idler sprocket 271, and the rear portion of the chain 270 is supported at the delivery end of the loading conveyer by a sprocket 272 secured to a shaft 273. A second sprocket 274 is secured to the shaft 273 and is connected to a sprocket 275 on the drive shaft 263 by a chain 276. A plurality of pusher dogs 277 are secured to the chain 270 at points spaced longitudinally of the latter, and these dogs engage the forward ends of the carriages 38 to actually push the carriages off of the loading conveyer onto the registering track of the transfer conveyer 41.

Thus, from the foregoing it will be noted that the chain 260 pulls the carriages 38 off of the transfer conveyer 44 onto the loading conveyer 35 and moves the carriages along the loading conveyer to a position adjacent the delivery end 39 thereof. The chain 270 then operates to push the carriages off of the delivery end of the loading conveyer onto the transfer conveyer 41. During the time required to advance the carriages 38 along the loading conveyer, the several parts of the work to be welded are positioned on the carriages so that when the carriages are moved onto the transfer conveyer 41 they are completely loaded.

Assuming that the carriages 38 are in the relative positions thereof shown in Figure 1 and that a welding cycle has just been completed, it will be noted that as the carriages 38 are moved on the track 37 of the welding conveyer 36, a limit switch 280 is closed. In actual construction, the limit switch is secured in a position to be operated by any one of the elevating plungers 91 as the latter are returned to their lowermost position. The limit switch 280 is connected in series with the indexing circuit which also includes the switches 281, 282, 283, 284, relay 285, and relay 286. All of the above switches must be closed before the circuit to the solenoid operated valve 79 is closed to index the carriages 38 along the welding conveyer.

In detail, the switch 281 is manually operated and is adapted to be locked in its closed position for automatic operation. The limit switch 282 is closed by a carriage 38 on the transfer conveyer 41 as this carriage is moved to a position in registration with the entrant end of the welding conveyer. In other words, a carriage 38 must be in registration with the entrant end 40 of the welding conveyer before the carriages on the welding conveyer are indexed. The limit switch 283 is positioned to be closed by the carriages 38 on the transfer conveyer 44 as the latter is indexed to move the carriages from the delivery end 42 of the welding conveyer to the entrant end 43 of the loading conveyer. Thus, it will be seen that a carriage 38 must be in registration with the entrant end 43 of the loading conveyer before the carriages on the welding conveyer are indexed. The limit switch 284 is normally closed and is moved to its open position by a carraige as the latter is moved onto the conveyer 44 from the delivery end 42 of the welding conveyer. As a result, the carriage in registration with the delivery end of the welding conveyer must be moved by the conveyer 44 to a position in registration with the loading conveyer before the indexing circuit can be closed. In other words, the limit switch 284 is merely a safety switch which prevents any possibility of operating the indexing means while a carriage is supported on the conveyer 44 in registration with the delivery end 42 of the welding conveyer.

It will also be noted from Figure 1 that as the conveyer 44 is advanced in the direction of the arrow 195 by the indexing rack 179, the latter closes a limit switch 287 connected in a circuit with the relay 285. As a result, the relay 285 is closed. Closing of the relay 285 energizes the coil of the relay 286 and closes the latter. As a result, the solenoid operated valve 79 is energized and fluid under pressure is admitted to the rear end of the cylinder 60 in Figure 9 to operate the indexing rack 68. The dog 69 on the rear end of the indexing rack engages the latch 73 depending from the forward end of the carriage 38 on the transfer conveyer 41 and moves the latter onto the welding conveyer to a position at the station 46. Owing to the fact that the carriages on the welding conveyer are in engagement with each other and are also in engagement with the carriage 38 on the transfer conveyer 41, it follows that all of the carriages on the welding conveyer are advanced.

As the carriage in registration with the first welding station 46 is moved by the indexing mechanism toward station 47, it closes a limit switch 289 connected in series in the loading conveyer motor circuit 290. A relay 291 is also connected in the circuit 290 in such a manner as to be closed by the limit switch 289 to start the motor 264, previously described as operatively connected to the loading conveyer chains 260 and 270 for actuating the latter. In this connection, attention is called to the fact that the circuit 290 also includes a plurality of normally closed stop switches 292 distributed at different points on the fixture and operable to open the circuit 290 in case of an emergency.

When the motor circuit 290 is closed, the carriage 38 on the transfer conveyer 44 opposite the entrant end 43 of the loading conveyer is pulled by the chain 260 off of the conveyer 44 onto the track 37 of the loading conveyer and the preceding carriage is advanced along the track 37. Also, the carriage 38 at the delivery end 39 of the loading conveyer is moved onto the registering track of the transfer conveyer 41 by the chain 270. The carriage 38 on the loading conveyer following the carriage which has just been moved off the delivery end 39 of the loading conveyer by the chain 270 closes a limit switch 293 arranged in a circuit 294 with the unlatching coil 295 of the relay 291. As a result, the coil 295 is energized and the relay 291 is opened to stop the loading conveyer. It will also be noted from Figure 1 that the unlatching coil 295 of the relay 291 is connected in a safety circuit 296 with a limit switch 297 positioned in advance of the limit switch 293 for operation by the carriage before the latter closes the switch 293. However, the switch 297 is prevented from closing the safety circuit through the release coil 295 until a limit switch 298 in the circuit 296 is closed by the carriage moved onto the transfer conveyer 41. It follows from the above that if for some reason the circuit 294 is not closed by the limit switch 293 to open the motor circuit 290, the latter will be opened by the safety circuit 296 as soon as a carriage is moved off the loading conveyer onto the transfer conveyer.

The conveyer 41 is indexed to transfer a carriage 38 from the delivery end 39 of the loading conveyer to the entrant end 40 of the welding conveyer. As shown in Figure 1, the rear end of the carriage previously moved off the conveyer 41 onto the welding conveyer closes a limit switch 299 as this carriage is indexed to station 46 of the welding conveyer. Closing of the limit switch 299 energizes a relay 300 connected in a circuit 301 which includes the solenoid operated valve 200 previously described as controlling the fluid pressure operated indexing device for the conveyer 41. The circuit 301, however, cannot be closed until a limit switch 302 in the circuit 300 is closed by a carriage moved onto the conveyer 41 from the delivery end 39 of the loading conveyer. The switch 302 is positioned to be closed as this carriage assumes a position on the conveyer 41 and, accordingly, premature operation of the conveyer 41 is avoided.

Closing of the limit switch 302 energizes a relay 303 in the circuit 300 and closes the latter. As a result, the solenoid valve 200 is energized to supply fluid pressure to the indexing cylinder 176, in the manner previously set forth, to move the conveyer in the direction of the arrow 199 in Figure 1. When the rack 179 is moved to the limit of its forward travel, it closes a limit switch 304 connected in a circuit 305 with a relay 306 and with the unlatching coil of the relay 303. Accordingly, the relay 303 is opened to deenergize the solenoid valve 200 and the relay 306 is closed to energize the solenoid valve 201. When the solenoid valve 201 is energized, fluid under pressure is supplied to the opposite end of the indexing cylinder 176 and the rack 179 is returned to its initial starting position. As the rack 179 is returned, it closes a limit switch 307 connected in a circuit 308 with the unlatching coil 309 of the relay 306 and energizes the latter coil to open the circuit 305 and deenergize the solenoid operated valve 201. It may be pointed out at this time that the relay 300 is unlatched by closing a circuit 310 including a limit switch 311 and the unlatching coil 312 of the relay 300. The limit switch 311 is closed at approximately the same time as the switch 282 by the carriages 38 as the latter assume positions in registration with the entrant end 40 of the welding conveyer 36.

It will also be noted that closing the circuit 301 in the above manner energizes a relay 313 to close a circuit to the solenoid operated valve 231. As pointed out above, when the valve 231 is energized it supplies fluid under pressure to the upper end of the latch cylinders 238 and to the cylinder 226 of the brake 221 associated with the transfer conveyer 41. Accordingly, the brake 221 is released and the latches 232 are moved out of interference with the transfer conveyer 41. As the carriage on the transfer conveyer 41 is moved by the latter to a position in registration with the entrant end 40 of the welding conveyer, it closes a limit switch 314 connected in a circuit 315 with the unlatching coil of the relay 313. Accordingly, the relay 313 is opened and the solenoid operated valve 231 is deenergized. Deenergization of the solenoid operated valve 231 moves the valve to a position wherein the upper ends of the latch cylinders 238 are exhausted and wherein the brake cylinder 226 is also connected to the exhaust. The arrangement is such that the springs 226' operate the brake 221 to retard movement of the conveyer 41 and the latch arms 233 are raised by the springs 235 to position the carriage on the conveyer 41 in accurate alignment with the entrant end 40 of the welding conveyer.

As a carriage 38 is advanced along the welding conveyer by the indexing rack 68 to a position at the final welding station 48, it closes a limit switch 316 connected in a circuit 317 with a pair of relays 318 and 319. The relay 318 closes a circuit to the solenoid operated valve 89 and energizes the latter. As the valve 89 is energized, it operates the brakes 80 to retard the indexing movement of the carriages on the welding conveyer and also operates the brake 202 to retard the movement of the carriage discharged from the delivery end 42 of the welding conveyer onto the transfer conveyer 44. On the other hand, closing of the relay 319 energizes the solenoid operated valve 99 and opens the latter to supply fluid under pressure to the lower end of the latch cylinder 95. As a result, the latch piston 98 is moved upwardly to locate the free end of the latch arm 94 into the path of travel of the carriages on the welding conveyer. In the present instance, the latch 93 is positioned to engage the forward end of the carriage at the final welding station 48 and thereby forms a positive stop for all of the carriages on the welding conveyer.

It will also be noted that as a carriage is indexed to the final welding station 48 it closes a limit switch 320 connected in a circuit with a relay 321. As the relay 321 is closed, the solenoid operated valve 114 is energized and the valve is opened to move the rack 106 in a direction to elevate the plungers 91. The carriages on the welding conveyer have been previously located by the latch 93 with the sockets 92 at the bottom of the carriages in alignment with the upper ends of the elevating plungers. As a result, the upper ends of the plungers 91 engage in the sockets and raise all of the carriages on the welding conveyer in an upward direction to position the work on the carriages in registration with the electrodes 131 of the welders 128 in the several groups supported by the welding conveyer.

It may be pointed out at this time that closing of the limit switch 320 energizes the unlatching coil 322 of the relay 286 and permits the latter to move to its open position. As a result, the solenoid operated valve 79 is deenergized and the rear end of the indexing cylinder 60 (Figure 9) is connected to the exhaust. The forward end of the indexing cylinder 60 is connected to a source of fluid under pressure to return the indexing rack 68 by closing a relay 323 which is connected in a circuit including the solenoid operated valve 78 to energize the latter. The relay 323 is closed by a limit switch 324 positioned in such a manner as to be closed by one of the lifting plungers 91 as the latter approaches its uppermost position. In other words, when the carriages are raised off of the welding conveyer, the limit switch 324 is closed to operate the relay 323 which controls the solenoid operated valve 78. It may also be pointed out at this time that the unlatching coil 325 of the relay 323 is energized to release the relay 323 by a limit switch 326 adapted to be closed by the indexing rack 68 as the latter approaches its initial starting position.

As the carriages on the welding conveyer approach their uppermost positions, the switches 140 (Figure 2) are closed to start the electric motors 136. The electric motors 136 respectively rotate the distributing arms 134 of the control units 51 in the manner previously set forth to supply a fluid under pressure to the welders 128. As a result, the electrodes 132 of the welders are moved downwardly and cooperate with the registering electrodes 116 on the carriages to clamp the work therebetween. The electric motors 136 also respectively rotate the operating discs 150 associated with the control units 151, and the latter function in the manner set forth above to operate the switch 141 to effect the desired weld during the intervals the electrodes are in engagement with the work.

It has also been pointed out above that after each group of welders is operated by its associated control unit 51, the discs 150 serve to close the limit switches 164. Upon reference to Figure 1, it will be noted that each limit switch 164 is arranged in a circuit with a relay 327, and these relays are connected in series in a circuit 328 with a relay 329. As a result, all of the switches 164 must be closed before the relay 329 is closed.

It will also be noted that when all of the relays 327 are closed the unlatching coil 330 of the relay 321 is energized to permit the relay 321 to open. As a result, the solenoid operated valve 114 is deenergized to connect the forward end of the lift cylinder 108 to the exhaust. On the other hand, closing of the relay 329 energizes the solenoid operated valve 115 and closes the latter to supply fluid under pressure to the rear end of the lift cylinder 108 and thereby operate the rack 106 to lower the elevating plungers 91. As a result, the carriages at the three welding stations are returned to their positions on the track 37 of the welding conveyer 36.

As the carriages are lowered by the lift plungers 91, one of the latter closes a limit switch 331. The limit switch 331 is connected in a circuit with the unlatching coils 332 of the relays 327 and with the unlatching coil 333 of the relay 329. As a result, the relays 327 and 329 are moved to their open positions.

During the interval the carriages on the welding conveyer are elevated, the work on the carriage previously moved off of the welding conveyer onto the transfer conveyer is lifted from the carriage by the unloading device previously described and shown in Figure 30 of the drawings. It may be pointed out at this time that as a carriage is moved onto the transfer conveyer 44 it closes a limit switch 334 arranged in a circuit 335 with the unlatching coil 336 of the relay 318. As a result, the relay 318 is moved to its open position and the solenoid operated valve 89 is deenergized to release the latch 93 and the brakes 81 and 202. It will also be noted from Figure 1 that the limit switch 334 is connected in a circuit with a relay 338, and the latter relay is, in turn, connected in a circuit with a relay 339. However, the relay 338 cannot be closed by the limit switch 334 until the limit switch 340 is closed by a carriage as the latter is moved off the transfer conveyer 44 onto the loading conveyer 35. It follows from the above that when both the limit switches 334 and 340 are closed, the two relay switches 338 and 339 are also closed. Closing of the relay 339 energizes the solenoid valve 197 and effects a movement of the transfer conveyer 44 in the direction of the arrow 195 to transfer the carriage at the delivery end 42 of the welding conveyer to the entrant end 43 of the loading conveyer. In this connection, it will be noted that a limit switch 342 is connected in series in the circuit including the solenoid valve 197 and, accordingly, must be closed before the solenoid valve 197 is energized. The switch 342 is also shown in Figure 30 as held in its open position by the unloading device and is not closed until the unloading device has completed its operation. Therefore, premature movement of the transfer conveyer 44 is avoided.

As pointed out above, when the rack 179 of the indexing mechanism, associated with the conveyer 44, is advanced to move the conveyer 44 in the direction of the arrow 195, it closes the limit switch 287. The switch 287 in addition to being connected in a circuit with the relay 285 is, also, connected in a circuit with a relay 344 and with the unlatching coil 345 of the relay 339. As a result, the relay 339 is opened to deenergize the solenoid valve 197 and the relay 344 is closed to energize the solenoid valve 198. Owing to the operation of these valves previously described, the index rack 179 for the conveyer 44 is returned to its initial starting position. As the rack 179 approaches its initial starting position, it closes a limit switch 346 connected in a circuit with the unlatching coil 347 of the relay 344. Accordingly, the relay 344 is opened to deenergize the solenoid valve 198 when the rack 179 assumes its starting position. It may be again pointed out at this time that closing of the limit switch 287 also closes the relay 285 in the indexing circuit for the welding conveyer. However, closing of the relay 285 must be accomplished by a closing of all of the switches 280, 281, 282, 283 and 284 in order to actually effect an operation of the welding conveyer indexing. Thus, the relay 285 merely constitutes another safety device for insuring advancement of the conveyer 44 before the welding conveyer indexing mechanism operates.

At the same time the relay 338 is energized or closed, a relay 350 is closed. The relay 350 energizes the solenoid valve 230 and the latter is moved to supply fluid pressure to the upper ends of the conveyer 44, latch cylinders 238, and to the conveyer 44 brake cylinder 226. As a result, the brake 221 is released and the latches 232 are swung out of the path of travel of the conveyer 44. As the carriage approaches its position in registration with the entrant end 43 of the loading conveyer, it closes a limit switch 351 connected in a circuit with the unlatching coil 352 of the relay 350. As a result, the relay 350 is opened and the solenoid valve 230 is deenergized to exhaust the upper ends of the conveyer 44 latch cylinders 238 and the brake cylinder 226. Accordingly, the latches are swung upwardly to their operative positions and the brake 221 is applied.

A limit switch 353 is also closed by a carriage on the conveyer 44 as the latter moves the carriage to a position in registration with the entrant end 43 of the loading conveyer. The limit switch 353 is connected in a circuit with the unlatching coil 354 of the relay 338 in the conveyer 44 indexing circuit and energization of this coil unlatches the relay 338 to permit the latter to open. In addition, it will be noted that the limit switch 353 is connected in a second circuit 355 with a limit switch 356 positioned to be closed by a carriage as it is moved onto the loading conveyer from the conveyer 44. The circuit 355 includes the unlatching coil 357 of the relay 285 and when both the switches 353 and 356 are closed, the relay 285 in the welding conveyer indexing circuit is unlatched to permit the same to open. The relay 285 remains open until the limit switch 287 is again closed by the indexing rack 179, associated with the conveyor 44, as the rack 179 moves the conveyer 44 in the direction of the arrow 195 in Figure 1.

Attention is called to the fact at this time that as the conveyer 44 is moved in the direction of the arrow 195 it closes a limit switch 358 connected in a circuit with a relay 359 and with the solenoid valve 219. The arrangement is such that closing of the relay 359 energizes the valve 219 and opens the latter to supply fluid under pressure to the lower end of the bumper cylinder 215, shown in Figure 32. As a result, the plunger 211 of the bumper is returned to its operative position for engagement by the next carriage discharged from the welding conveyer. The relay 359 is unlatched to open the relay and deenergize the valve 219 by a limit switch 360 positioned for operation by the conveyer 44 as the latter continues its movement in the direction of the arrow 195. When the valve 219 is deenergized, it exhausts the lower end of the cylinder 215 and thereby conditions the bumper for the next operation.

Operation

It follows from the above that the transfer conveyers 41 and 44 are advanced during the intervals of rest of the indexing mechanism for the carriages on the welding conveyer. The conveyer 41 moves a carriage from the delivery end 39 of the loading conveyer to the entrant end of the welding conveyer and the conveyer 44 moves a carriage from the delivery end of the welding conveyer to the entrant end of the loading conveyer. As soon as the transfer conveyers perform the above operations, the indexing cylinder 60 (Figure 9) moves the rack 68 to pull the carriage at the entrant end of the welding conveyer off the transfer conveyer 41 onto the welding conveyer. This latter carriage assumes a position at station 46 at the end of the indexing movement and the remaining carriages on the welding conveyer are advanced to the next adjacent station because all of the carriages are in contact with one another. The carriage which was previously positioned at the final welding station 48 is moved by the indexing rack 68 onto the conveyer 44 where the work is removed from the latter by manipulation of the unloading device described in connection with Figure 30.

During the indexing movement of the carriages along the welding conveyer, a carriage is supported by the conveyer 44 opposite the entrant end 43 of the loading conveyer, as shown in Figure 1. The loading conveyer is advanced during the operation of the welding conveyer indexing mechanism and the chain 260 pulls the carriage from the conveyer 44 onto the loading conveyer. At the same time, of course, the preceding carriages on the loading conveyer are advanced by the chain 260 and the carriage adjacent the delivery end 39 of the loading conveyer is pushed by the chain 270 onto the transfer conveyer 41. Movement of the chains 260 and 270 is then discontinued and the transfer conveyers are advanced. As stated above, the conveyer 41 is moved in the direction of the arrow 199 (Figure 1) to move the carriage in registration with the entrant end of the welding conveyer, and the conveyer 44 is advanced in the direction of the arrow 195 to move a carriage in registration with the entrant end 43 of the loading conveyer.

While the transfer conveyers are being advanced, the carriages on the welding conveyer are elevated by the devices 90 (Figures 15 and 16) to position the work on the carriages in registration with the groups of welders at the three stations 46, 47 and 48. The welders in each group are operated by control devices 51 which, in turn, are automatically operated by movement of the carriages to their uppermost positions. After the welding cycle of each group of welders is completed, the carriages are automatically lowered by closing the switches 164 in the manner described in detail above. When the carriages assume positions on the track 37 of the welding conveyer, the indexing mechanism for the welding conveyer is again operated and the foregoing steps are repeated.

What I claim as my invention is:

1. In welding apparatus, a track, a plurality of groups of welders supported above the track in spaced relation to each other in the direction of length of the track, a work supporting carriage movable along the track by a step by step movement to successively position the work in registration with the groups of welders, means operating during the intervals of rest of the carriage to lift the carriage off the track to position the work in operative relation to the adjacent group of welders and to subsequently return the carriage to said track, and means responsive to return movement of the carriage on the track to index said carriage.

2. In welding apparatus, a track, a plurality of groups of welders supported above the track in spaced relation to each other longitudinally of the track, a work supporting carriage movable along the track by a step by step movement to successively position the work in registration with the groups of welders, electrodes mounted on the carriage in positions to cooperate with the welders to clamp the work therebetween, means operating during the intervals of rest of the carriage to lift the carriage off said track and position the work in operative relation to the registering group of welders, means operated by the carriage as it approaches its uppermost position to operate the welders registering with the work, means for returning the carriage to the track subsequent to the operation of the welders, and means operated by the carriage as it assumes a position on the track to index said carriage.

3. In welding apparatus, a track, a plurality of groups of welders supported above the track in spaced relation to each other in the direction of length of the track, a plurality of work supporting carriages movable along the track by a step by step movement to successively position the work carried thereby in registration with the groups of welders, means operating during the intervals of rest of the carriages to lift the latter off the track to position the work in operative relation to the groups of welders, means for stopping the carriages in registration with the lifting means, and means for retarding movement of the carriages prior to operation of said stopping means.

4. In welding apparatus, a track, a plurality of groups of welders supported above the track in spaced relation to each other in the direction of length of the track, a plurality of work supporting carriages movable along the track by a step by step movement to successively register the work on the carriages with the groups of welders, means operated by one of the carriages at the end of one indexing movement to lift the carriages to position the work in operative relation to the welders, and means responsive to movement of the carriages to their uppermost positions to operate said groups of welders and weld the work at a plurality of points.

5. In welding apparatus, a track having an entrant end and having a delivery end, a plurality of groups of welders supported above the track between said ends in spaced relation to each other longitudinally of the track, a plurality of work supporting carriages positioned on the track with the front end of one carriage abutting the rear end of the adjacent carriage, indexing means engageable with the carriage at the entrant end of the track to move all the carriages along the track from the entrant end to the delivery end by a step by step movement to successively register the work on the carriages with said groups of welders, means operated during the intervals of rest of the carriages to lift the work on said carriages into operative relation to the groups of welders, latch means for stopping the carriages in registration with the work lifting means, and means operated by the carriage leaving the delivery end of the track for operating said latch means.

6. In welding apparatus, a loading conveyer track having an entrant end and a delivery end, a welding conveyer track having an entrant end and a delivery end, work supporting carriages mounted on said tracks, welders supported above the welding conveyer track, indexing means for moving the carriages on the welding conveyer by a step by step movement to successively register the work with the welders, means for moving the carriages on the loading conveyer in timed relation to the indexing movement of the carriages on the welding conveyer, and means operating during the intervals of rest of the carriages on the welding conveyer to transfer a carriage from the delivery end of the loading conveyer to the entrant end of the welding conveyer.

7. In welding apparatus, a loading conveyer track having an entrant end and a delivery end, a welding conveyer track having an entrant end and a delivery end, work supporting carriages mounted on said tracks, welders supported above the welding conveyer track, indexing means for moving the carriages on the welding conveyer by a step by step movement to successively register the work with the welders, means for moving the carriages on the loading conveyer in timed relation to the indexing movement of the carriages on the welding conveyer, means operating during the intervals of rest of the carriages on the welding conveyer to transfer a carriage from the delivery end of the loading conveyer to the entrant end of the welding conveyer and to transfer a carriage from the delivery end of the welding conveyer to the entrant end of the loading conveyer, and means for removing work from the last named carriage.

8. In welding apparatus, a welding conveyer track having an entrant end, a plurality of welders supported above the track, a plurality of work supporting carriages movable along the track by a step by step movement to successively position the work in registration with the welders, indexing means for moving said carriages by a step by step movement including an electric control circuit, means operating during the intervals of rest of said carriages to move a carriage having work to be welded thereon into registration with the entrant end of the welding conveyer track, a switch in the indexing control circuit, and means operated by said last named carriage as it assumes a position in registration with the entrant end of the conveyer track to close said switch.

9. In welding apparatus, a conveyer track having an entrant end, a plurality of welders supported above the track, a plurality of work supporting carriages movable along the track by a step by step movement to successively position the work in registration with the welders, indexing means for moving the carriages along the track including an electric control circuit, means operating during the intervals of rest of the carriages to lift the work into operative relationship with the welders and to subsequently return the work, a switch in the indexing control circuit movable to its closed position upon return of the work, means operable during the intervals of rest of the carriages to move a carriage having work to be welded thereon into registration with the entrant end of the conveyer track, a second switch in the indexing control circuit, and means responsive to movement of a carriage to a position in registration with the entrant end of said track to close the second switch.

10. In welding apparatus, a conveyer track having an entrant end and having a delivery end, a plurality of welders supported above the track, work supporting carriages movable along the track by a step by step movement to successively position the work in registration with the welders, indexing means for moving the carriages along the conveyer track and including an electric control circuit, a loading station spaced from the delivery end of the conveyer track, means operating during the intervals of rest of the carriages to transfer a carriage from the delivery end of the track to the loading station, a switch in the indexing control circuit, and means responsive to movement of a carriage to a position at said loading station to close said switch.

11. A welding apparatus, a conveyer track having an entrant end and having a delivery end, a loading station spaced from the delivery end of the track, a plurality of welders supported above the track, work supporting carriages movable along the track by a step by step movement to successively register the work with said welders, indexing means for moving the carriages along said track and including an electric circuit, means operating during the intervals of rest of the carriages to move a carriage having the work to be welded supported thereon into registration with the entrant end of the conveyer track, means also operating during the intervals of rest of the carriages to transfer a carriage from the delivery end of the conveyer track to the loading station, and switches in the indexing control circuit respectively closed by said carriages as the latter assume positions in registration with the entrant end of the conveyer track and with the loading station.

12. In welding apparatus, a conveyer track having an entrant end and a delivery end, a loading station spaced from the delivery end of the track, a plurality of welders supported above the track between said ends, work supporting carriages movable along the track by a step by step movement to successively position the work thereon in registration with the said welders, indexing means for moving the carriages along the track including an electric circuit, means operating during the intervals of rest of the carriages to lift the latter off of the track to position the work thereon in operative relation to the welders and to subsequently return the carriages to a position on the track, means for moving a carriage having work to be welded thereon into registration with the entrant end of the track during the intervals of rest of the carriages on the track, a normally open switch in the control circuit, means responsive to movement of the last named carriage to a position in registration with the entrant end of the track to close said switch, a second normally open switch connected in the control circuit in series with the first switch, means responsive to return movement of the carriages to positions on said track to close the second switch, means also operating during the intervals of rest of the carriages on the track to transfer a carriage from the delivery end of the track to the loading station, and a third normally open switch connected in the indexing control circuit in series with the two aforesaid switches, and means responsive to movement of said last mentioned carriage to a position at the loading station to close the third switch.

13. In welding apparatus, a loading conveyer track, a welding conveyer track supported adjacent the loading conveyer track, work supporting carriages mounted on said tracks, welders supported above the welding conveyer track, indexing means for moving the carriages on the welding conveyer track by a step by step movement to successively register the work on the carriages with the welders, means for moving the carriages on the loading conveyer in timed relation to movement of the carriages on the welding conveyer, cross conveyers positioned at opposite ends of the tracks to respectively transfer a carriage having the work to be welded thereon from the delivery end of the loading conveyer track to the entrant end of the welding conveyer track and to transfer a carriage from the delivery end of the welding conveyer track to the entrant end of the loading conveyer track, and means operable during the intervals of rest of the carriages on the welding conveyer track to operate said cross conveyers.

14. In welding apparatus, a loading conveyer track, a welding conveyer track supported adjacent the loading conveyer, welders supported above the welding conveyer track, work supporting carriages mounted on each of the tracks, indexing means for moving the carriages on the welding conveyer track by a step by step movement to successively register the work on the carriages with the welders, means for moving the carriages on the loading conveyer in timed relation to movement of the carriages on the welding conveyer, and means operating during the intervals of rest of the carriages on the welding conveyer and responsive to movement of the carriage off of the delivery end of the loading conveyer to transfer the latter carriage to a position in registration with the welding conveyer.

15. In welding apparatus, a loading conveyer track, a welding conveyer track supported adjacent the loading conveyer, welders supported above the welding conveyer track, work supporting carriages mounted on each of the tracks, indexing means for moving the carriages on the welding conveyer track by a step by step movement to successively register the work on the carriages with the welders, means for moving the carriages on the loading conveyer in timed relation to the carriages on the welding conveyer, means operating during the intervals of rest of the carriages on the welding conveyer and responsive to movement of a carriage off of the delivery end of the loading conveyer to transfer the latter carriage to a position in registration with the welding conveyer, and means rendered operative by a carriage leaving the delivery end of the welding conveyer to transfer the last named carriage to a position in registration with the entrant end of the loading conveyer.

16. In welding apparatus, a loading conveyer track, a welding conveyer track positioned adjacent the loading conveyer track, work supporting carriages mounted on the tracks, welders supported above the welding conveyer track, indexing means for moving the carriages on the welding conveyer by a step by step movement to successively register the work with the welders, means for moving the carriages on the loading conveyer in timed relation to the carriages on the welding conveyer, a cross conveyer for receiving a carriage from the delivery end of the loading conveyer and for transferring the latter carriage to the entrant end of the welding conveyer, a second cross conveyer for receiving a carriage from the delivery end of the welding conveyer and for transferring the latter carriage to the entrant end of the loading conveyer, means for operating the cross conveyers during the intervals of rest of the carriages on the welding conveyer, and means responsive to initial indexing movement of a carriage on the welding conveyer to initiate operation of the loading conveyer operating means.

17. In welding apparatus, a track, a plurality of welders supported above the track, work supporting carriages movable along the track by a step by step movement to successively position the work in registration with the welders, indexing means for moving the carriages along the track and including an electric circuit, a loading station positioned to one side of the delivery end of the track, means operated by the carriage leaving the delivery end of the track to transfer the carriage to the loading station, a normally open switch in the indexing circuit, and means responsive to movement of the last named carriage to a position at the loading station to close said switch.

18. In welding apparatus, a loading conveyer track, a welding conveyer track supported adjacent the loading conveyer track, work supporting carriages mounted on the tracks for movement along the latter, welders supported above the welding conveyer track, indexing means for moving the carriages on the welding conveyer by a step by step movement to successively register the work with the welders, means for moving the carriages on the loading conveyer including an electric control circuit, a switch in said circuit, means responsive to initial indexing movement of a carriage on the welding conveyer to close said switch, means for opening the control circuit after the carriage at the delivery end of the loading conveyer is moved off said end, and means controlled by movement of the last named carriage off the delivery end of the loading conveyer to transfer said carriage to the entrant end of the welding conveyer.

19. In welding apparatus, a track, a plurality of groups of welders supported above the track in spaced relation to each other in the direction of length of the track, a plurality of work supporting carriages movable along the track by a step by step movement to successively position the work carried thereby in registration with the groups of welders, and means operating during the intervals of rest of the carriages to simultaneously lift the carriages off the track to position the work in operative relation to the groups of welders and to subsequently return said carriages to positions on the track.

20. In welding apparatus, a track, a plurality of welders supported above the track in spaced relation to each other in the direction of length of the track, a plurality of work supporting carriages movable along the track by a step by step movement to successively position the work carried thereby in registration with the groups of welders, means operating during the intervals of rest of the carriages to lift the work to positions in operative relation to said groups of welders, means for lowering the work subsequent to completion of the operation of the groups of welders and including an electric control circuit, a plurality of switches corresponding in number to the number of groups of welders and connected in series with the work lowering control circuit, and means dependent upon the completion of the operation of each group of welders to respectively close said switches.

21. In welding apparatus, a track, a plurality of groups of welders supported above the track in spaced relation to each other in the direction of length of the track, a plurality of work supporting carriages movable along the track by a step by step movement to successively position the work carried thereby in registration with the groups of welders, means operating during the intervals of rest of the carriages to simultaneously lift the carriages off the track to position the work in operative relation to the groups of welders and to subsequently return said carriages to positions on the track, means for lowering the carriages onto the track including an electric control circuit, a plurality of switches corresponding in number to the number of groups of welders and connected in series in said circuit, and means responsive to the completion of the operation of the welders in each group to respectively close said switches.

22. In welding apparatus, a track, a plurality of groups of welders supported above the track in spaced relation to each other in the direction of length of the track and each group of welders comprising at least two sets of welders, a plurality of work supporting carriages movable along the track by a step by step movement to successively register the work thereon with each group of welders, means operating during the intervals of rest of the carriages to lift the work into operative relationship with the groups of welders, means for lowering the work subsequent to the welding operations including a plurality of switches connected in series in an electric circuit, said switches corresponding in number to the number of sets of welders, and means responsive to the completion of the operation of the welders in each set to respectively close said switches.

23. In welding apparatus, a loading conveyer track, a welding conveyer track supported adjacent the loading conveyer track, work supporting carriages mounted on said tracks, welders supported above the welding conveyer track, indexing means for moving the carriages on the welding conveyer track by a step by step movement to successively register the work on the carriages with the welders, means for moving the carriages on the loading conveyer in timed relation to movement of the carriages on the welding conveyer, cross conveyers positioned at opposite ends of the tracks to respectively transfer a carriage having the work to be welded thereon from the delivery end of the loading conveyer track to the entrant end of the welding conveyer track and to transfer a carriage from the delivery end of the welding conveyer track to the entrant end of the loading conveyer track, means operated by a carriage moved off the delivery end of the welding conveyer by the indexing means to operate the cross conveyer at the latter end of the welding conveyer and transfer the carriage to the entrant end of the loading conveyer, and means operated by a carriage moved off the delivery end of the loading conveyer to operate the cross conveyer at the latter end of the loading conveyer and transfer the carriage to the delivery end of the welding conveyer.

HENRY THOMAS PLATZ.